(12) United States Patent
Tachibana et al.

(10) Patent No.: US 7,587,604 B2
(45) Date of Patent: *Sep. 8, 2009

(54) WATERMARK SIGNAL GENERATING METHOD

(75) Inventors: Ryuki Tachibana, Yokohama (JP); Ryo Sugihara, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/121,917

(22) Filed: May 16, 2008

(65) Prior Publication Data

US 2008/0285794 A1 Nov. 20, 2008

(51) Int. Cl.
*H04L 9/00* (2006.01)
*H04N 7/167* (2006.01)

(52) U.S. Cl. ...................... 713/176; 380/210
(58) Field of Classification Search ................ 380/210, 380/252; 713/176; 283/113, 72; 358/3.28; 382/232

See application file for complete search history.

(56) References Cited

U.S. PATENT DOCUMENTS 6,205,249 B1 * 3/2001 Moskowitz ................. 382/232
6,674,876 B1 * 1/2004 Hannigan et al. ............ 382/100
6,901,514 B1 * 5/2005 Iu et al. ....................... 713/176
6,996,248 B2 * 2/2006 Fudge et al. ................ 382/100

FOREIGN PATENT DOCUMENTS

WO WO0223905 A1 3/2002

* cited by examiner

*Primary Examiner*—Matthew B Smithers
*Assistant Examiner*—Ali S Abyaneh
(74) *Attorney, Agent, or Firm*—Shimokaji & Associates, P.C.; Louis P. Herzberg

(57) ABSTRACT

An apparatus 10 for generating wartermark signals to be embedded as a digital watermark in real-time contents includes: input means 12 for inputting the real-time contents; an input buffer 14 for storing the real-time contents; generation means for generating wartermark signals corresponding to predicted intensities of the real-time contents from divided real-time contents; and an output buffer 18 for storing the generated watermark signals to be outputted. The generation means is configured by including prediction means 16 for predicting intensities of the wartermark signals; control means 20 for controlling embedding by use of a message to be embedded as the digital watermark in the divided real-time contents; and means 22 for generating the wartermark signals to be outputted.

1 Claim, 24 Drawing Sheets

WATERMARK SIGNAL GENERATING METHOD

RELATED APPLICATIONS

This application claims the benefit of priority from application Ser. No. 10/523,251 filed Sep. 19, 2005, now U.S. Pat. No. 7,461,256, issued Dec. 2, 2008.

TECHNICAL FIELD

The present invention relates to a digital watermark for adding information concerning rights such as a copy right to contents. More specifically, the present invention relates to a wartermark (WM) signal generating apparatus which can correct trouble caused by delay from the contents being supplied in a real time manner due to calculation of the digital watermark, which can provide contents of a better quality, and which can improve capability in detecting the digital watermark; a wartermark signal generating method and a computer-executable program for executing the program; a computer-readable storage medium into which the program is stored; and a digital watermark embedding apparatus and a digital television apparatus including the digital watermark embedding apparatus.

BACKGROUND

Watermark techniques have been heretofore used for determining whether a bill and the like are authentic or counterfeit. In addition, these years, as computer technologies are being developed, there have been an increased number of cases where music, an image, an animation are supplied as digital contents on a basis of copyrights thereof. For this reason, an unauthorized copy of the contents needs to be prevented by using the aforementioned "watermark" techniques in order to determine whether the contents have been copied in an unauthorized manner. Embedding of a "watermark" in contents is performed through embedding a "watermark signal" (hereinafter referred to as a "wartermark signal") in original contents in a digital manner as a general practice.

Various digital watermark embedding methods have been heretofore proposed. For example, in "a system and method for embedding data in a frequency domain" proposed by the same applicant, it has been considered that, when a digital watermark is intended to be embedded in contents including audio signals such as music, a psychoacoustic model is calculated in the frequency domain, thereby embedding the digital watermark. In this method, a DFT (discrete Fourier Transform) frame needs to be detected exactly when a frequency of an audio signal is detected. This increases time needed for the calculation. For this reason, this method has a disadvantage that the method is not suitable for a purpose of embedding, without causing time delay, wartermark signals in audio signals being supplied in a real time manner.

With this taken into consideration, in a patent application filed by the same applicant, entitled "a system and method for embedding a watermark without requiring frame synchronization," a technique of embedding wartermark signals without requiring a frame to be synchronized with audio signals has been considered. The embedding technique without requiring the frame synchronization has the following advantages. First, robustness to expansion, contraction and locational shift of original signals is large. Second, the time delay is not so large. Third, the digital watermark can be detected and judged with good performance. However, with regard to the aforementioned embedding technique without requiring the frame synchronization, phases respectively of the wartermark signals and the original signals need to be synchronized. For this reason, the embedding technique without requiring the frame synchronization is not suitable for a purpose of embedding wartermark signals in contents being supplied in a real time manner, from which only the wartermark signals are delayed. Accordingly, the embedding technique without requiring the frame synchronization has had a trouble in robustness. That is, when delay is caused only in wartermark signals, capability of detecting the wartermark signals is deteriorated to a large extent.

In addition, according to Boney, et al, "Digital Watermarks for Audio Signals," (IEEE International Conference on Multimedia Computing and System, Jun. 17-23, 1996, Hiroshima, Japan, pp. 473-480), the aforementioned trouble of deteriorated robustness due to delayed wartermark signals is corrected by providing a filter for simulating the psychoacoustic model in advance and by filtering a pseudo-random sequence in the time domain. However, a filtering coefficient has to be determined for each frame. For this reason, in common with the above mentioned method, this method is not suitable for embedding wartermark signals in audio signals being supplied in a real time manner.

Furthermore, in "Robust Audio Watermarking Using Perceptual Masking" (Signal Processing, Vol. 66, 1998, pp. 337-355), Swanson and his group have proposed a method using both a psychological audio-visual sensation model for calculating frequency masking and a psychoacoustic model for calculating temporal masking. With regard to the temporal masking, wartermark signals are embedded by prediction of an envelope calculation of audio signals and an amount of masking. However, the prediction is a prediction of an amount of masking by use of an output of the temporal masking. The method is not for embedding wartermark signals in a real time manner by directly using the original contents.

Apart from this, a technique has been proposed of embedding a digital watermark in image data such as video signals. For example, in "Robust 3D DFT Video Watermarking," Proc. SPIE, Vol. 3657, pp. 113-124, 1999, Deguillaum and his group have proposed a method for embedding wartermark signals by adapting a DFT with a video sequence used as three-dimensional information constituted of a vertical, horizontal and temporal axes. Even in this method, delay is caused by a time width for which the DFT is performed. For this reason, this method is not suitable for embedding a digital watermark in a real time manner.

Moreover, Japanese Patent Laid-open Official Gazette No. Hei. 11-55638 has disclosed a method which defines a partial area in an image as an area to which information is added, and which embeds the information in the image by enlarging or reducing this area. This embedding method does not add a wartermark signal to the image, but processes a part of the image itself. For this reason, a difference between a pre-embedded signal and a post-embedded signal is so large that a problem with quality is brought about. In addition, in "Watermarking of Uncompressed and Compressed Video," Signal Processing, Vol. 66, No. 3, pp. 283-301, 1998, Hartung and his group have disclosed a method which regards a video as a continuation of still images, and which adds a message which has been modulated by a pseudo-random sequence to each frame. Additionally, Hartung and his group have proposed a method in which a compressed video sequence is not decoded, and in which a DFT count is replaced depending upon a message whenever deemed necessary. However, even the method proposed by Hartung and his group does not perform a control in a predictive manner. In this point, the method is not satisfactory in embedding wartermark signals in contents in a real-time manner.

SUMMARY OF THE INVENTION

Main objectives of the aforementioned digital watermark are to protect a copy right when multimedia data are distributed through the Internet, and to protect a copy right when media such as a DVD-Video and a DVD-Audio are distributed. These digital content shave already been stored in storage media. The aforementioned techniques have been designed to perform processing of embedding wartermark signals in these stored digital contents, but have not been designed to embed wartermark signals in contents being supplied in a real-time manner.

However, as an applicable scope of digital information is being enlarged, an illicit act as described below can be conceived. That is, sounds of music being played in a classical music concert are recorded in a tape recorder which has been brought in the concert hall in an unauthorized manner. After the concert, the music is recorded in CDs, and the CDs are sold. Otherwise, the music is made public through the Internet. In addition, a movie being projected on a screen is recorded in a video camera which has been brought in the movie theater in an unauthorized manner. Later, the movie is recorded in DVDs or Video CDs, and the DVDs or Video CDs are sold. Otherwise, the movie is made public through the Internet. Furthermore, when a music event or a sport event is broadcast live through radio and television, the received broadcast program is recorded. Later, the program is recorded in storage media such as DVD Videos, and the DVD Videos are sold. Otherwise, the program is provided through the Internet. Moreover, copyrights are intended to be claimed in some cases. In other cases, recorders who have recorded sounds or videos are intended to be identified. Furthermore, places where such sounds or videos have been recorded are intended to be identified.

FIG. 22 shows an apparatus for embedding a digital watermark in contents being supplied in a real time manner by use of a conventional technique of embedding wartermark signals. A digital watermark embedding apparatus 200 shown in FIG. 22 can embed a digital watermark in music played live and a program broadcast live (hereinafter referred to as "real-time contents"), which are being supplied in a real time manner. The digital watermark embedding apparatus 200 shown in FIG. 22 is configured by including acquisition means 202 for acquiring real-time contents in a digital manner and generation means 204 for generating a digital watermark by use of the acquired real-time contents. Contents in which a digital watermark has been embedded are supplied to users through a network 206. Since the digital watermark has been embedded in the contents, copyrights of the suppliers are protected even though users record music or videos.

Here, a further detailed description will be given of the conventional digital watermark embedding apparatus shown in FIG. 22. Generation means 204 to be included in the conventional digital watermark embedding apparatus is configured by including an input buffer 208, digital watermark calculating means 210 and an output buffer 212. The input buffer 208 buffers data which have been acquired by the acquisition means 202 in a digital manner. The digital watermark calculating means 210 generates a digital watermark signal with an adequate size on a basis of a psychoacoustic model and the like by use of real-time contents which have been acquired. In addition, the output buffer 212 temporarily stores contents in which the digital watermark has been embedded until the contents in which the digital watermark has been embedded are supplied through the network 206.

For this reason, time delay of at maximum several hundreds of milliseconds are normally generated between a time when real-time contents have been acquired and a time when contents in which a digital watermark has been embedded are transmitted to the network 206. In addition, real-time contents are necessarily required to go through the generation means 204. For this reason, in a case where a digital watermark is intended to be embedded in contents and the contents are intended to be supplied, a trouble in which the contents can not be supplied may be brought about if even any one of the components constituting the digital watermark embedding apparatus 200 is out of order. Even if it does not go to as far as a situation where the contents can not be supplied, a trouble may be brought about that an abnormal sound or image is added to contents while the contents are being supplied, thereby causing a quality in the supplying of the contents to be deteriorated.

Furthermore, the conventional digital watermark embedding apparatus shown in FIG. 22 has another trouble that a digital watermark can not be embedded in contents such as a classical music concert whose sound or image is not recorded at all before the contents reach the audience. In addition, since the conventional digital watermark embedding apparatus shown in FIG. 22 includes an ADC for converting the actual play from analog signals to digital signals, yet another trouble may be brought about that noise is necessarily generated, thereby causing a quality in the real-time contents to be deteriorated.

FIG. 23 shows an alternative apparatus for correcting troubles which are caused by the conventional digital watermark embedding apparatus shown in FIG. 22. In the digital watermark embedding apparatus 214 shown in FIG. 22, an output from the acquisition means 202 for acquiring real-time contents in a digital manner is inputted into generation means 216 and delay means 218 in parallel. The generation means 216 outputs only a wartermark signal which has been calculated by the digital watermark calculating means 210. An output from the delay means 218 and an output from the output buffer 212 are inputted in embedding means 222 such as a mixer. Thereby, the wartermark signal is designed to be able to be embedded in real-time contents. The digital watermark embedding apparatus 214 shown in FIG. 23 also can not deal with contents whose sound or image is not recorded at all before the contents reach the audience as described above. Although the digital watermark embedding apparatus 214 can correct the time delay of the calculated wartermark signal from the contents, the following troubles remain to be solved. First, delay of the contents themselves is caused. Second, the supplying of the contents may be interrupted due to failure of the delay means 218.

In order to solve the aforementioned problems, also, considered is a digital watermark embedding apparatus to which the delay means shown in FIG. 23 is not provided, and which adds a generated wartermark signal and information concerning contents. However, if the delay means is not used, a time difference is caused between real-time contents and wartermark signals by a time needed to calculate the wartermark signals, although a time delay in the real-time contents themselves is not caused. As a result, further another problem is brought about. FIG. 24 shows the aforementioned problem which is newly brought about with the digital watermark embedding apparatus shown in FIG. 23.

FIG. 24 is a schematic diagram showing change in real-time contents with time and timing of embedding calculated wartermark signals, citing a case where the digital watermark embedding apparatus 214 shown in FIG. 23 is used. Supposing that real-time contents are acquired into the generation means at a time $t_1$ as shown in FIG. 24, amplitude of the real-time contents varies with time depending on conditions in which the play or the like is performed. In the embodiment shown in FIG. 24, the amplitude continues decreasing after a time $t_4$. On the other hand, wartermark signals are generated by calculating an inaudible amount or an invisible amount by use of a psychoacoustic model in addition to performing processes such as inputs buffering and outputs buffering. For this reason, the wartermark signals are embedded, which is delayed from a sampling frame $(t_2-t_1)$ of the real-time contents which have been used for the calculation by a time $(t_4-t_2)$ delayed due to the calculation of the wartermark signals.

In this case, when a method for generating the wartermark signals by use of the real-time contents is adopted, the following troubles may be brought about. The digital watermark may be unable to be detected depending on intensities of the real-time contents after the delayed time. Even if the digital watermark, does not go to as far as being unable to be detected, the digital watermark may be difficult to be detected. In the present invention, the aforementioned troubles will be referred to below as the relation of robustness to capability in detecting a digital watermark. Furthermore, when amplitudes of real-time contents are used and a method for embedding wartermark signals by adjusting the amplitudes of the wartermark signals is used, still another trouble is brought about that the wartermark signals are audible in the conventional example shown in FIG. 24. In the present invention, the aforementioned shift in amplitude between wartermark signals and real-time contents will be referred to below as a quality.

The present invention has been carried out in order to improve the robustness and quality of the aforementioned conventional techniques with a concept that factors of deteriorating the robustness and causes of deteriorating the quality are dealt with separately, thereby enabling the troubles with the conventional system to be solved. In other words, the present invention has been carried out with the following concept. The time delay between real-time contents and timing of embedding wartermark signals is inevitable. When wartermark signals are intended to be embedded, the robustness and the quality can be improved, if real-time contents are divided, change in perceptual stimulation values such as a phase, sound volume and luminance is predicted relative to time by use of the divided real-time contents, and intensities of the wartermark signals are calculated. In addition, real-time contents which are not used for the prediction process are supplied to users, which is independent of generation of the wartermark signals.

In other words, whether in music or in animation, a value of stimulation to the perception such as sound volume and luminance of real-time contents changes within a range of time needed for generating wartermark signals with relations therebetween which are predictable to some extent. The present invention has been carried out with the following concept. That is, if the past change with time in real-time contents being an object in which wartermark signals are embedded is paid attention to, and if the past change with time is used, future prediction of intensities of the real-time contents after a time which is as short as the delayed time can be performed in a satisfactory manner.

In addition, when a wartermark signal is intended to be embedded by use of a secret key, if a value to be embedded is generated by use of a certain rule from the secret key, and if signal intensity of the wartermark signal is controlled by use of the generated value to be embedded, the robustness according to the present invention can be improved with satisfactory performance. Embedding of a wartermark signal is performed depending on the sign of a value to be embedded. For example, when a value to be embedded is a negative, intensity of the wartermark signal is defined as zero. Only when a value to be embedded is a positive, the wartermark signal which is not zero is embedded. Since occurrence of time delay is a prerequisite, a phase of embedding of a wartermark signal can be added randomly without causing the phase of embedding of the wartermark signal to depend on a phase of the real-time contents. If a wartermark signal would be embedded according to the present invention, the robustness could be improved by use of information such as a secret key, a bit of a message and a pseudo-random number, independently of the generation of the delayed time.

Specifically, according to the present invention, provided is a wartermark signal generating apparatus for generating wartermark signals to be embedded as a digital watermark in real-time contents, the wartermark signal generating apparatus including:

input means for inputting the real-time contents;

an input buffer for storing the real-time contents;

generation means for generating, from the real-time contents, wartermark signals to be outputted corresponding to predicted intensities of the real-time contents; and an output buffer for storing the generated wartermark signals to be outputted, wherein the generation means includes:

prediction means for predicting intensities of the wartermark signals from prediction of perceptual stimulation values of the real-time contents after a predetermined lapse of time;

control means for controlling embedding by use of a message to be embedded as a digital watermark in the real-time contents; and means for generating the wartermark signals to be outputted by use of outputs from the prediction means and outputs from the control means.

With regard to the present invention, the perceptual stimulation values represent sound or luminance, and the prediction means can generate a predicted inaudible amount or a predicted invisible amount of wartermark signals corresponding to intensities of the real-time contents after the predetermined lapse of time by use of data stored in the input buffer. The control means according to the present invention can include means for generating a value to be embedded, which is a binary based on a positive and a negative, by use of a secret key, the message and a pseudo-random number. In addition, the wartermark signal generating apparatus according to the present invention can further include output controlling means for controlling outputs from the output buffer by comparing the generated wartermark signals with the real-time contents after a time needed to embed the generated wartermark signals has passed. The input means according to the present invention can include means for dividing, and inputting, the real-time contents, and the generation means can generate wartermark signals by use of the divided real-time contents.

According to the present invention, provided is a wartermark signal generating method for generating wartermark signals to be embedded as a digital watermark in real-time contents, the wartermark signal generating method including the steps of:

inputting the real-time contents;

storing the real-time contents;

generating, from the real-time contents, wartermark signals to be outputted, corresponding to predicted intensities of the real-time contents; and storing the generated wartermark signals to be outputted, wherein the generation step includes the steps of:

predicting intensities of the wartermark signals from prediction of perceptual stimulation values of the real-time contents after a predetermined lapse of time;

controlling embedding by use of a message to be embedded as a digital watermark in the real-time contents; and generating the wartermark signals to be outputted by use of outputs from the prediction step and outputs from the control step.

According to the present invention, provided is a program for causing a wartermark signal generating method to be executed, the program being a computer-executable program for causing a computer to execute the method for generating wartermark signals to be embedded as a digital watermark in real-time contents, wherein the program causes the computer to execute the steps of:

storing the real-time contents which have been inputted;

generating, from the real-time contents, wartermark signals to be outputted corresponding to predicted intensities of the real-time contents; and storing the generated wartermark signals to be outputted, wherein the generation step includes the steps of:

predicting intensities of the wartermark signals from prediction of perceptual stimulation values of the real-time contents after a predetermined lapse of time;

controlling embedding by use of a message to be embedded as a digital watermark in the real-time contents; and generating the wartermark signals to be outputted by use of outputs from the prediction step and outputs from the control step.

According to the present invention, provided is a computer-readable storage medium, in which a computer-executable program for causing a computer to execute a method for generating wartermark signals to be embedded as a digital watermark in real-time contents is stored, wherein the program causes the computer to execute the steps of:

storing the real-time contents which have been inputted;

generating, from the real-time contents, wartermark signals to be outputted corresponding to predicted intensities of the real-time contents; and storing the generated wartermark signals to be outputted, wherein the generation step includes the steps of:

predicting intensities of the wartermark signals from prediction of perceptual stimulation values of the real-time contents after a predetermined lapse of time;

controlling embedding by use of a message to be embedded as a digital watermark in the real-time contents; and generating the wartermark signals to be outputted by use of outputs from the prediction step and outputs from the control step.

According to the present invention, provided is a digital watermark embedding apparatus for embedding a digital watermark in real-time contents, the apparatus including:

input means for inputting the real-time contents;

an input buffer for storing the real-time contents;

generation means for generating, from the real-time contents, wartermark signals to be outputted corresponding to predicted intensities of the real-time contents;

an output buffer for storing the generated wartermark signals to be outputted; and embedding means for receiving the generated wartermark signals, and for embedding the generated wartermark signals in the real-time contents, wherein the generation means includes:

prediction means for predicting intensities of the wartermark signals from prediction of perceptual stimulation values of the real-time contents after a predetermined lapse of time;

control means for controlling embedding by use of a message to be embedded as a digital watermark in the real-time contents; and means for generating the wartermark signals to be outputted, by use of outputs from the prediction means and outputs from the control means.

According to the present invention, provided is a digital television apparatus, including:

means for receiving a digital broadcast, for decoding the digital broadcast, and for generate real-time contents;

display means for displaying the generated real-time contents; and a digital watermark embedding apparatus for embedding a digital watermark the decoded real-time contents, wherein the digital watermark embedding apparatus includes:

input means for inputting the real-time contents;

an input buffer for storing the real-time contents;

generation means for generating, from the real-time contents, wartermark signals to be outputted, corresponding to predicted intensities of the real-time contents;

an output buffer for storing the generated wartermark signals to be outputted;

embedding means for receiving the generated wartermark signals to be outputted, and for embedding the generated wartermark signals to be outputted in the real-time contents, and wherein the generation means includes:

prediction means for predicting intensities of the wartermark signals from prediction of perceptual stimulation values of the real-time contents after a predetermined lapse of time;

control means for controlling embedding by use of a message to be embedded as a digital watermark in the real-time contents; and means for generating the wartermark signals to be outputted, by use of outputs from the prediction means and outputs from the control means.

In the digital television apparatus according to the present invention, it is preferable that the digital watermark embedding apparatus be included in an external device of the digital television apparatus or in the digital television apparatus. It is preferable that the input means include means for dividing, and inputting, the real-time contents, and that the control means control embedding by use of the message and a secret key.

DETAILED DESCRIPTION OF THE INVENTION

The present invention will be described below in detail citing the modes shown in the accompanying drawings. However, the present invention is not limited to the below-described modes.

Figure 1:
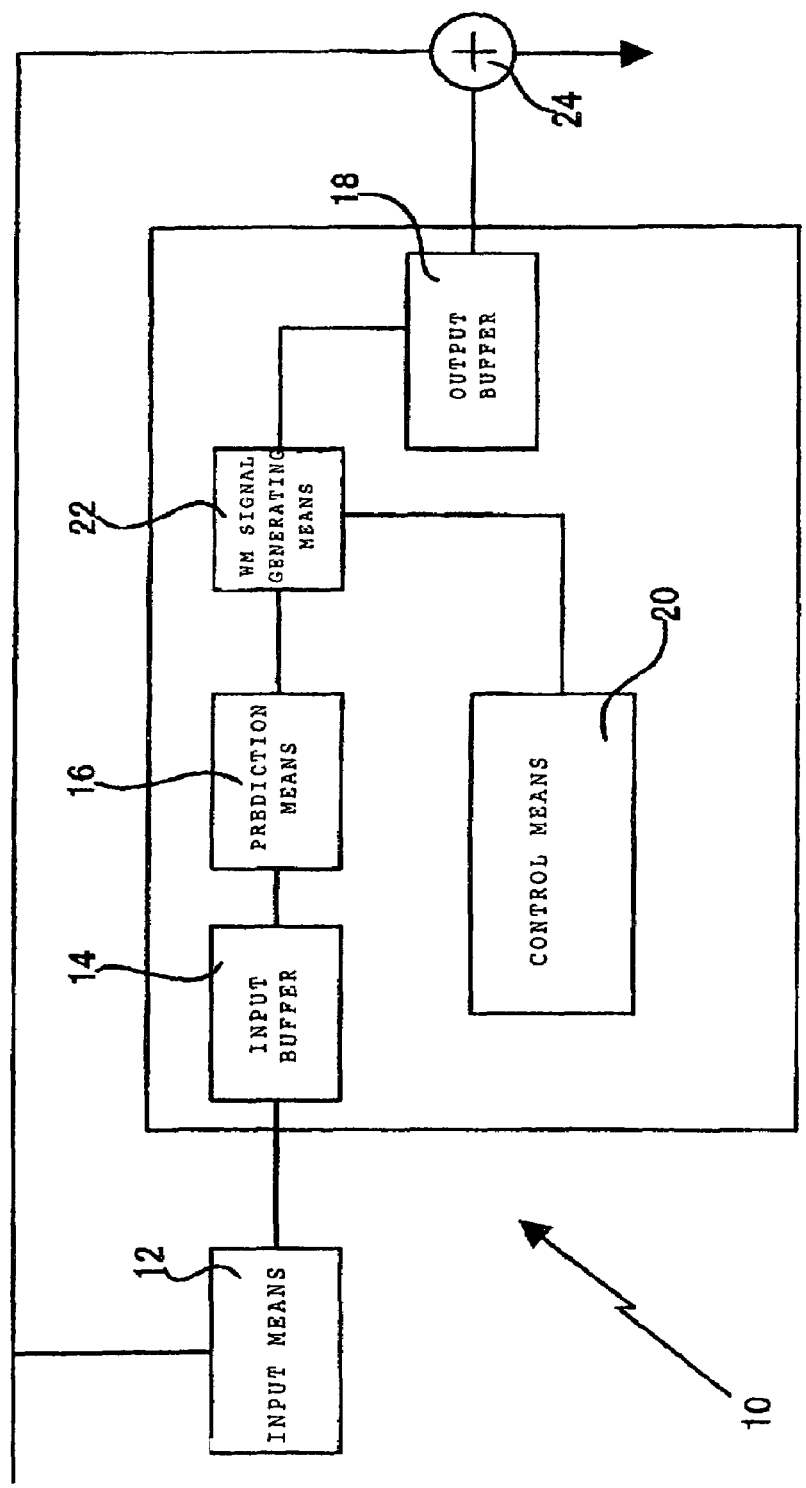
FIG. 1 is a diagram showing a wartermark signal generating apparatus according to the present invention.

FIG. 1 shows a functional block diagram of a wartermark signal generating apparatus according to the present invention. The wartermark signal generating apparatus 10 according to the present invention shown in FIG. 1 is configured by including: input means 12 for inputting real-time contents; an input buffer 14 for processing the real-time contents which have been acquired by the input means 12 in an uninterrupted manner; prediction means 16 for predicting wartermark signals after a delayed time by use of data which have been accumulated in the input buffer 14; an output buffer 18 for accumulating the wartermark signals with generated intensities before the wartermark signals are outputted; control means 20 for controlling values of the wartermark signals by generating values to be embedded; and wartermark signal generating means 22 for generating the wartermark signals to be outputted by use of the values to be embedded. The prediction means 16, the control means 20 and the wartermark signal generating means 22 constitutes generation means with a function for generating wartermark signals to be outputted which are embedded finally in the present invention.

Data such as music played live and a live program are inputted as real-time contents in the input means 12. This input means 12 functions as means for dividing the real-time contents, and digitalizes the real-time contents by use of means such as an ADC. After dividing the real-time contents, the input means 12 transfers the real-time contents to the input buffer 14. The input buffer 14 stores the received data for each of adequate process frames, and transfers the data to the prediction means 16. The input buffer 14 is configured to be able to supply the wartermark signals to the real-time contents in an uninterrupted manner, and to be able to store at least one or more frames of the real-time contents in order to supply prediction of intensities of the wartermark signals with time.

When data are audio data, the prediction means 16 predicts intensities of wartermark signals after a predetermined lapse of time by use of a psychoacoustic model. When real-time contents are image data, the prediction means 16 divides the image data into tile-shaped rectangular regions, predicts luminances of the respective tiles, and generates signals depending on the respective luminaces, thereby predicting wartermark signals. Values to be embedded which are generated by the control means 20 are generated as wartermark signals to be outputted in the wartermark signal generating means 22 by adding the predicted values of the wartermark signals, as they are, to real-time contents, or by controlling the wartermark signals so that the intensities of the wartermark signals come to be zero. The wartermark signals to be outputted are once stored in the output buffer 18. Subsequently, the wartermark signals are embedded in the real-time contents by embedding means 24 such as a mixer, a microphone and a projector.

In the present invention, when real-time contents are audio contents such as music played live, embedding of wartermark signals in the real-time contents can be performed by generating audio signals corresponding to the wartermark signals by use of a sound generation device such as an amplifier and a speaker. Furthermore, when real-time contents are a live program or a movie, embedding of wartermark signals in the real-time contents can be performed by use of a mixer and the like for video signals. In addition, wartermark signals can be embedded in both of audio signals and video signals.

Here, a detailed description will be given of a delayed time needed between a time when inputted real-time contents are acquired into the input buffer 14 and a time when the real-contents are outputted, as wartermark signals to be outputted, from the output buffer 18. For the present invention, a description will be provided citing an example of audio data. When reproduction is performed with CD sound quality, if a frequency of 44.1 kHz is used, and if one frame is constituted, for example, of 1,024 samples, it takes at least 23.2 milliseconds for the input buffer 14 to accumulate the audio data. In addition, when data of 1,024 samples are used, it takes typically approximately 3.7 milliseconds to generate wartermark signals by causing a DFT and a mask amount to be calculated by use of a psychoacoustic model to be described later. In common with the input buffer 14, a delayed time of 23.2 milliseconds, which is as much as is caused to the input buffer 14, is caused with regard to the output buffer 18, with reproduction with CD sound quality taken into consideration.

Accordingly, until watermark signals have been embedded in real-time contents, a delayed time of at least approximately 50 milliseconds is assumed to occur. In addition, if another delay due to an ADC and the like is caused, an aggregated delayed time of approximately 100 milliseconds is assumed to occur. Consequently, with sound quality, in particular, taken into consideration, a signal intensity after approximately 100 milliseconds needs to be predicted. Furthermore, when contents are supplied with DVD sound quality, both input and output with 96 kHz are needed. This case can be also dealt with by predicting real-time data between approximately 50 milliseconds and 100 milliseconds.

The prediction means 16 according to the present invention predicts time development of real-time contents, and thereby calculating wartermark signals with adjusted intensities. The prediction of time development of real-time contents is performed by doing things such as extrapolating time behavior of the real-time contents in a frame to be used for generating wartermark signals, by use of, for example, an adequate function in the time interval of the frame. Thereby, calculated is a weight at a time watermark signals to be outputted are embedded. wartermark signals which have been obtained by use of a psychoacoustic model is multiplied by this weight. Thus, time development of the original contents is reflected on the intensities of the wartermark signals.

In the present invention, an exponential function, a linear function, a trigonometric function and the like can be used for the prediction. In addition, other functions other than these functions can be used.

Furthermore, the control means 20 according to the present invention stores a message to be embedded as a secret key and a digital watermark. The control means 20 generates values to be embedded by use of bits of the message from which the secret key and wartermark signals are generated. The generated values to be embedded is used for judging embedding of signals which have been generated by the prediction means 16. The wartermark signal generation means 22 generates wartermark signals to be outputted on a basis of the values to be embedded. The wartermark signals to be outputted are accumulated in the output buffer 18, and thereafter are transferred to embedding means 24. Real-time contents a real so inputted to the embedding means 24, and thereby embedding of the generated wartermark signals to be outputted is performed. Embedded contents in which the wartermark signals have been embedded are supplied to users through an adequate media. Accordingly, if users copy the contents in an unauthorized manner and provide the contents in the form of CDs or through the Internet for a profit-making purpose, the contents are designed to prove that the copy is illicit.

Figure 2:
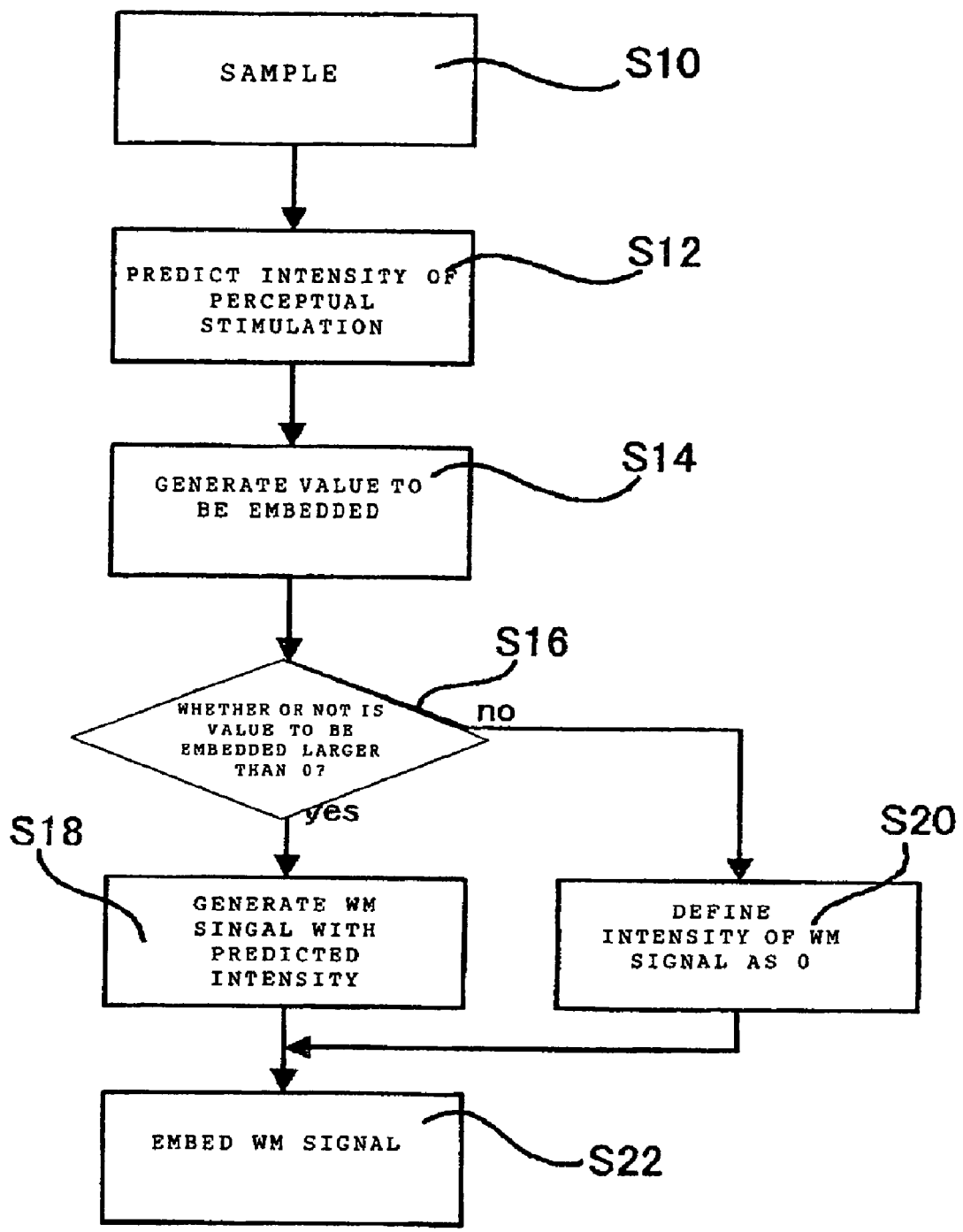
FIG. 2 is, a flowchart of processing of generating a wartermark signal according to the present invention.

FIG. 2 is a flowchart showing processing in the watermark signal generating apparatus 10 according to the present invention. With regard to processing of generating wartermark signals according to the present invention, in step S10, real-time contents are sampled from the input means 12, and are stored in the input buffer 14. In step S12, prediction means is used to predict intensities of perceptual stimulation values after a delayed time. In step S14, control means is used to generate values S to be embedded for controlling embedding of the wartermark signals, by use of a secret key and a message. In the present invention, the values S to be embedded take on one of the two values, that is, +1 or −1. These values S to be embedded are transferred to means for generating wartermark signals to be outputted, and are used to control output of wartermark signals. Specifically, in step S16, it is determined whether or not the values S to be embedded which have been generated by the control means are larger than zero. If the values S to be embedded are larger than zero (yes) wartermark signals to be outputted are generated by use of the predicted values in step S18. If the values S to be embedded are smaller than an zero (no), wartermark signals with signal intensities of zero are generated without using the predicted values in step S20. Thereafter, the wartermark signals to be outputted in the frequency domain are converted into wartermark signals to be outputted in the time domain, and are stored, for example, in the output buffer 18. In step S22, the wartermark signals to be outputted are outputted to the embedding means, and the embedding is caused to be performed.

A description will be given below of processing to be performed in the prediction means 16 and the control means 20 and the wartermark signal generation means 22.

A. Detailed Configuration of the Prediction Means and Processing by the Same.

Figure 3:
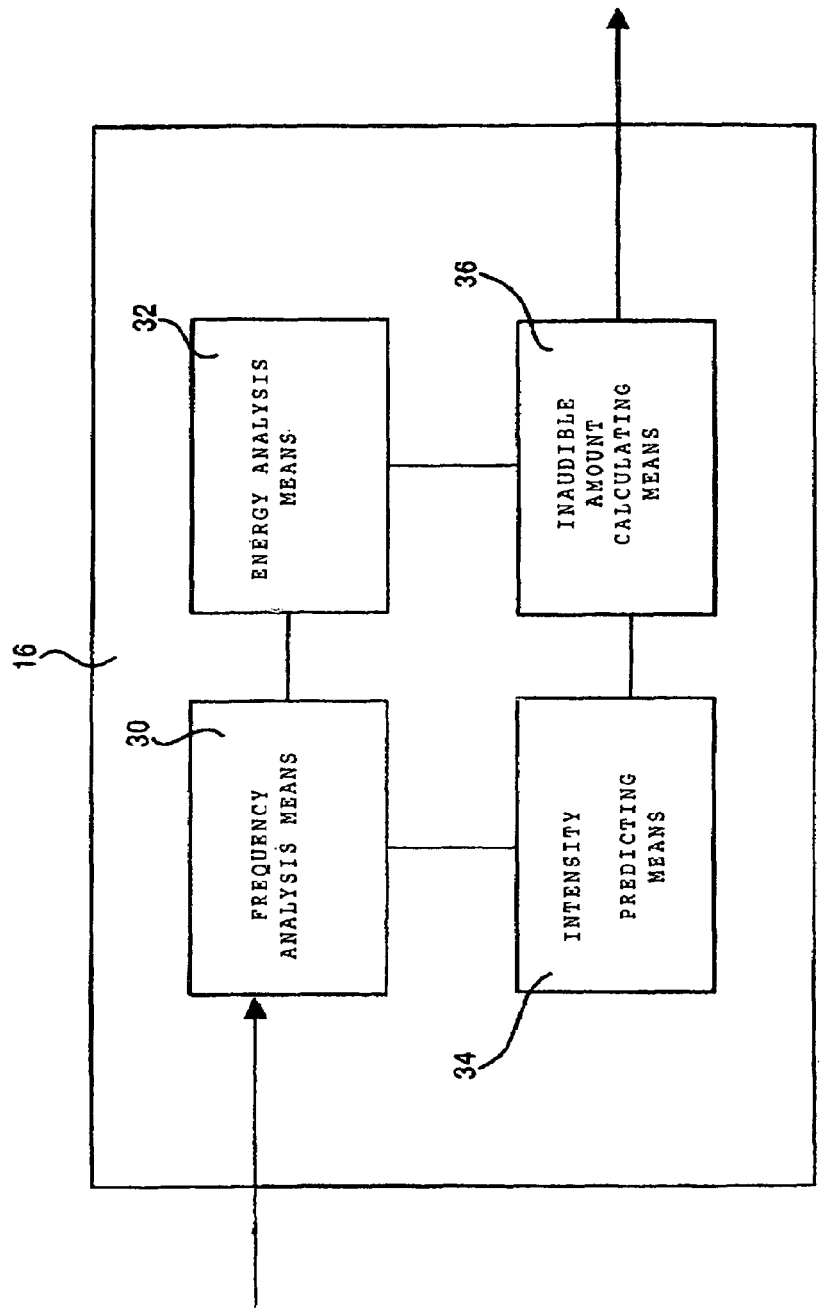
FIG. 3 is a detailed functional block diagram of prediction means according to the present invention.

(A-1) Prediction of Wartermark Signals Corresponding to Audio Signals and Processing of the Same In the prediction means 16, processing for improvement of the quality is performed by use of real-time contents which have been stored in the input buffer 14 are used. The processing of improving the quality includes (1) the generating of wartermark signals by use of a psychoacoustic model and (2) the calculating of weights of the wartermark signals by prediction of time development of the original contents. FIG. 3 is a diagram showing a detailed configuration of the prediction means 16 which can be used for generating wartermark signals corresponding to audio signals in the present invention. The prediction means 16 shown in FIG. 3 is configured by including frequency analysis means 30, energy analysis means 32, intensity-frequency prediction means 34 and inaudible amount calculating means 36.

The frequency analysis means 30 acquires data for a frame to be processed from the input buffer 14, and performs frequency analysis by use of a Fourier transform, a cosine transform, a wavelet transform and the like. A frame to be processed in the present invention can have, for example, 1,024 samples, which is as many as the number of samples per frame in the input buffer 14. The number of samples in a frame to be processed may be 512 or 2,048 depending on the processing capability.

In addition, the energy analysis means 32 calculates a sum of two squares of an amplitude $X_{f,\omega}$ of each frequency component ω, with a frame to be processed defined as a unit, by use of a result of a frequency analysis which has been obtained by the frequency analysis means 30, and defines the sum of two squares as energy of the frequency component ω. Here, f represents the number of a frame to be processed, and ω represents a frequency component. If energy of a frequency band b of a frame to be obtained is expressed by $E_{f,b}$, the energy $E_{f,b}$ is found by the below-mentioned expression.

[Expression 1]

$$E_{f,b} = \sum_{\omega \in Band(b)} x_{f,w}^2 \qquad (1)$$

In the aforementioned expression (1), Band(b) represents a set of frequency components included in a frequency band b. In the present invention, energy of each frequency band can be calculated merely as a sum of amplitudes, instead of as the aforementioned sum of two squares. Otherwise, the energy can be found by any other methods.

Figure 4:
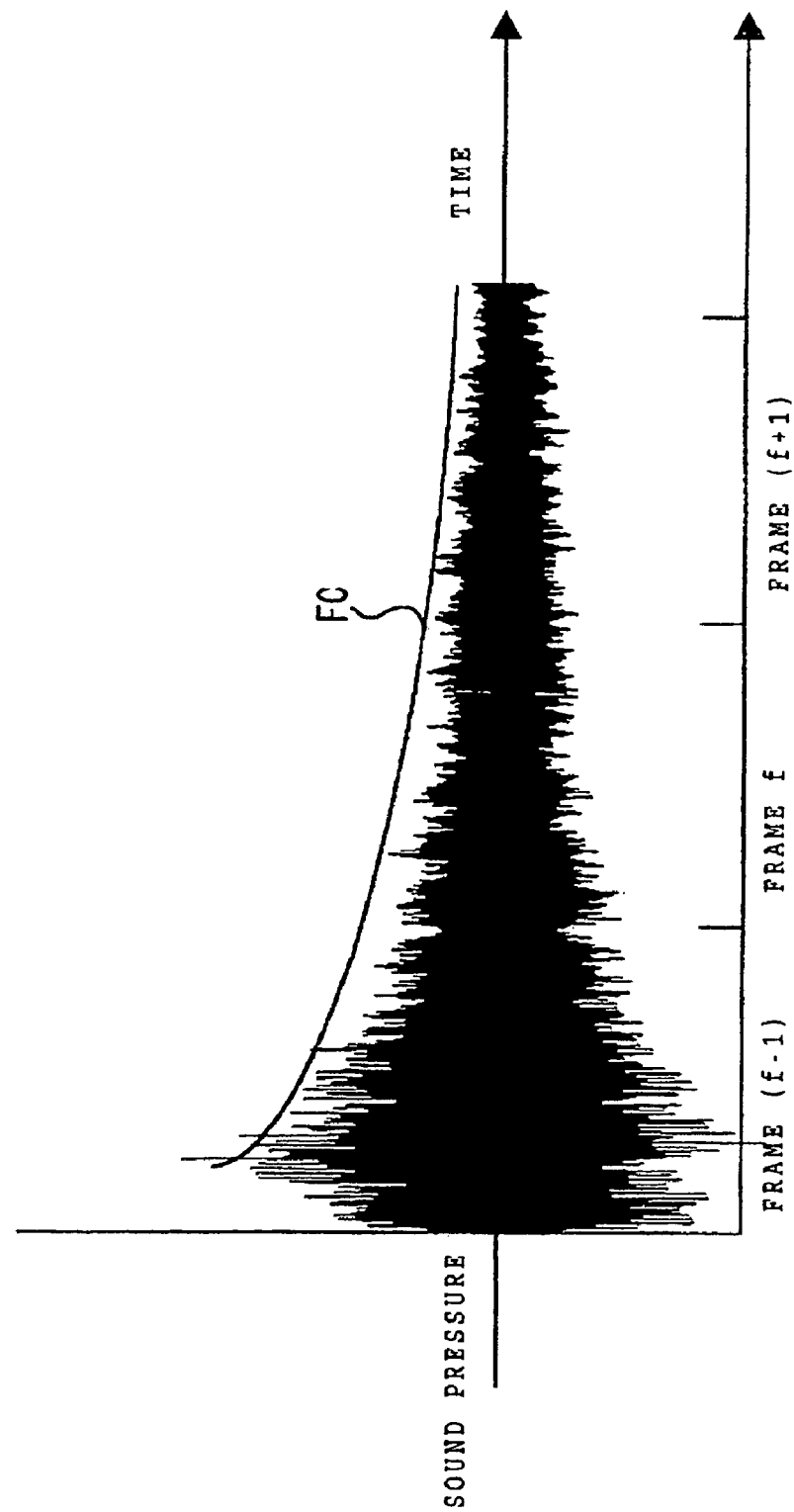
FIG. 4 is a diagram showing a mode of the present invention which predicts intensity after a delayed time.

The intensity-frequency prediction means 34 is configured by including, for example, a buffer memory, and performs prediction of intensity and frequency in the following frame (f+1) by use of a frame which is being processed at present. FIG. 4 shows relations among frames in the intensity-frequency prediction means 34. In FIG. 4, the axis of abscissa represents time, and the axis of ordinate represents sound pressure. FIG. 4 shows relations between each of frames to be processed and each of amplitudes of the respective real-time contents. A frame which is being processed at present is a fth frame, and a frame to be predicted is a (f+1)th frame. In the present invention, as shown in FIG. 4, time development of each frequency can be predicted by use of an exponential function, a linear function, a trigonometric function or the like, and thereby a weight can be calculated. In FIG. 4, a fitting curve which is obtained from energy of each frequency band, and which is calculated by an exponential function, is shown by reference symbol FC. Furthermore, in the present invention in particular, the prediction can be performed with a more precise time development taken into consideration by use of two consecutive frames to be processed, instead of being performed by use of a single frame to be processed.

When prediction is performed by use of an exponential function, a weighing factor is given by the below-mentioned expression (2). When prediction is performed by use of a linear function, a weighing factor is given by the below-mentioned expression (3).

[Expression 2]

$$\hat{E}_{f+1,b} = \frac{E_{f,b}^2}{E_{f-1,b}} \quad (2)$$

[Expression 3]

$$\hat{E}_{f+1,b} = 2E_{f,b}^2 - E_{f-1,b} \quad (3)$$

In the aforementioned expression (3), when a predicted value is a negative, zero is used as the predicted value. In addition, prediction of a frequency component is given by the below-mentioned expression (4), or more simply by the below-mentioned expression (5), by use of the predicted value of energy which has been found.

[Expression 4]

$$\hat{x}_{f+1,\omega} = x_{f,\omega} \cdot \frac{\hat{E}_{f+1}}{E_f} \quad (4)$$

[Expression 5]

$$\hat{x}_{f+1,\omega} = \sqrt{\frac{\hat{E}_{f+1}}{|\text{Band}(b)|}} \quad (5)$$

In the aforementioned expressions, ω represents a frequency component constituting a frequency band Band(b). In addition, |Band(b)| indicates a size of a set A.

Subsequently, the inaudible amount calculating means 36 calculates sizes ω of the respective wartermark signals which are inaudible to a human, for each frequency component by use of the predicted value of the frequency component which has been generated. In the present invention, since a psychoacoustic model is not the subject matter, a detailed description thereof will be omitted. However, for a method in which the psychoacoustic model is employed, for example, the prior art shown above can be referred to. In addition, in another mode of the present invention, not only the amplitude can be predicted, but also a phase can be predicted in the same manner.

Figure 5:
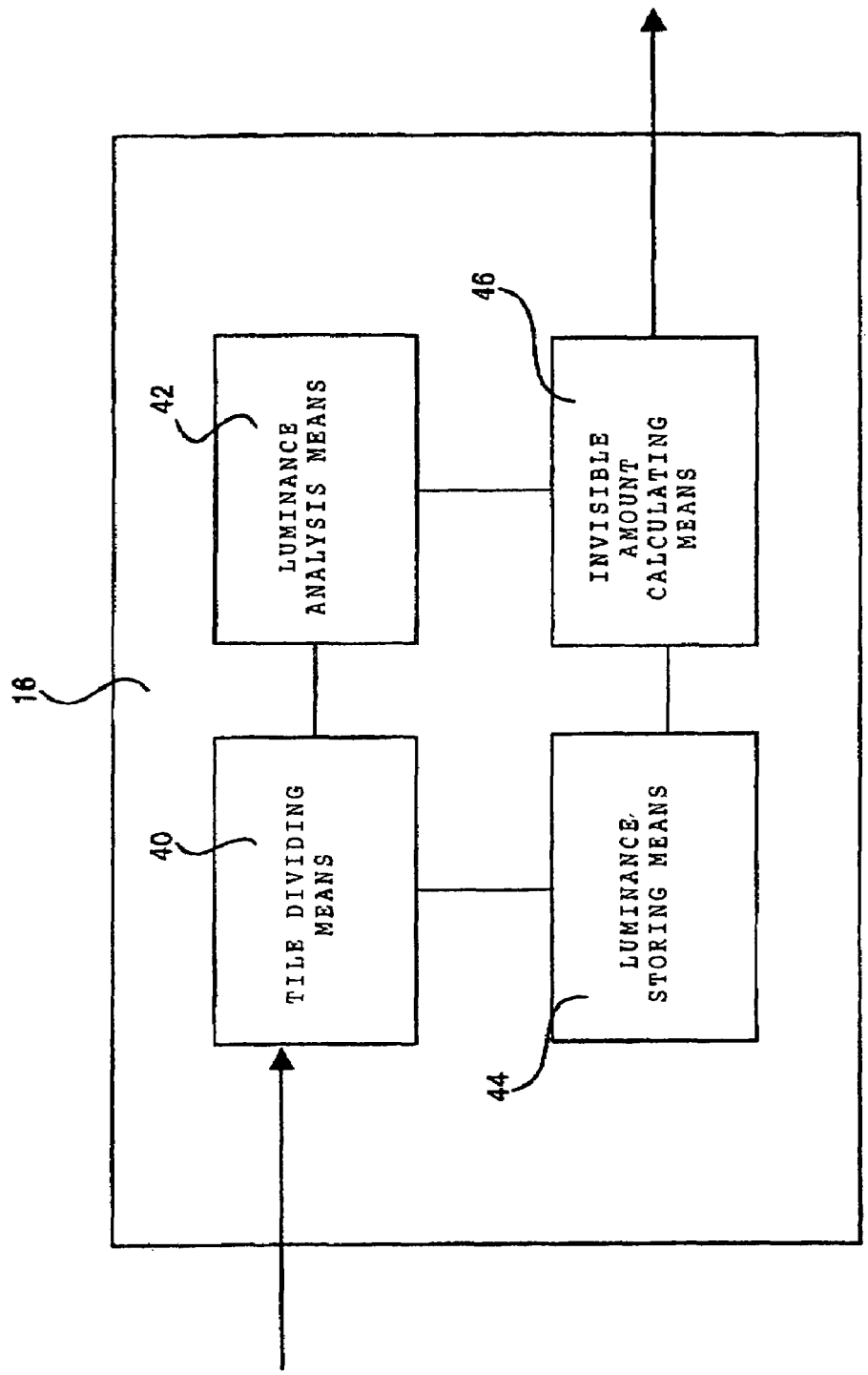
FIG. 5 is a block diagram of prediction means for predicting luminance of a video signal after a delayed time in the present invention.
Figure 6:
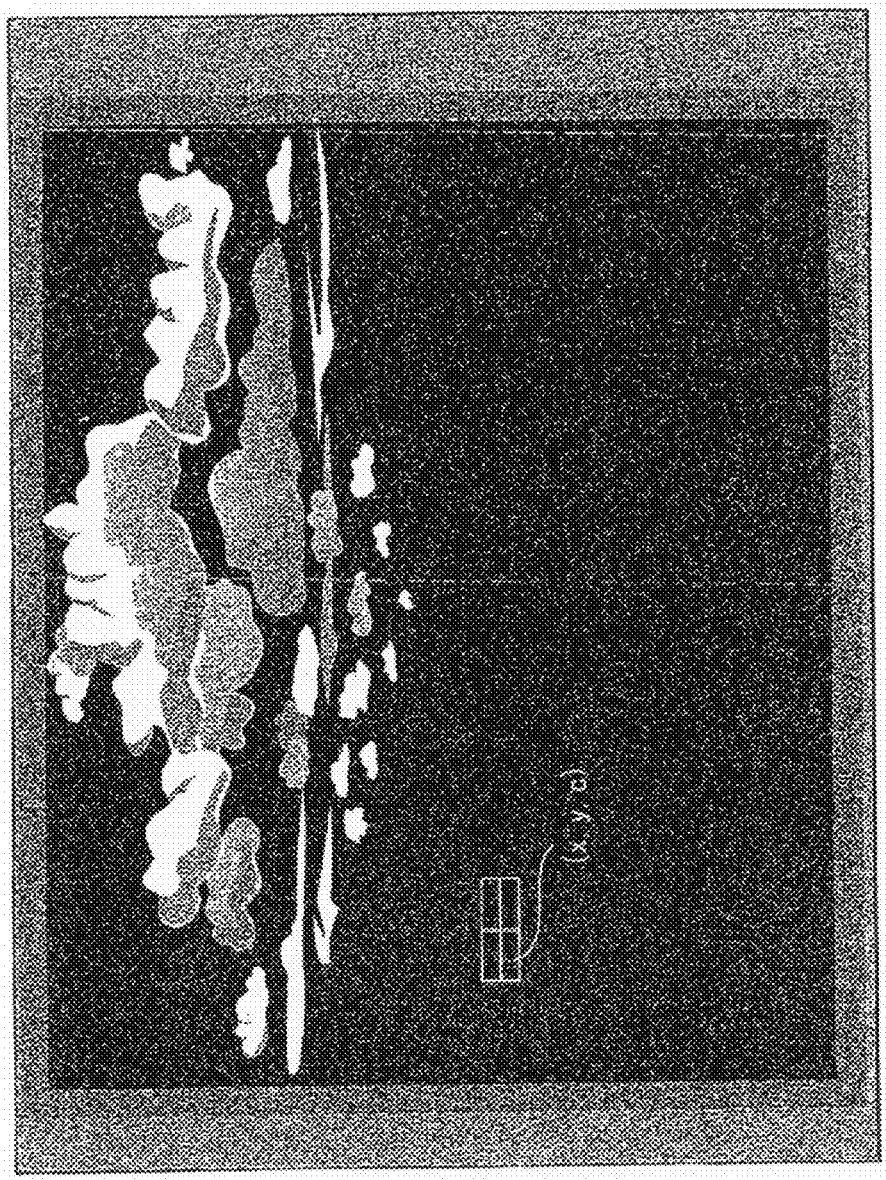
FIG. 6 is a diagram showing a mode of the present invention in which a tile is divided.

(A-2) Prediction of Wartermark Signals Corresponding to Video Signals and Processing of the Same Almost the same processing can be adapted for video signals. FIG. 5 shows a detailed configuration of the prediction means 16 for video signals in the present invention. A description will be given below of processing of generating wartermark signals corresponding to video signals on a basis of intensity prediction in the present invention. A video frame which has been inputted from the input buffer 14 is inputted, into tile dividing means 40, as three-dimensional data in which pixels are arranged in the vertical and horizontal directions, and in which luminance corresponds to each of the pixels. FIG. 6 is a diagram showing a mode of the tile division to be carried out in the present invention. As shown in FIG. 6, the tile dividing means 40 divides a video frames into tiles with a given size, selects a pixel included in the tile, and identifies axes of coordinates of, and luminance (x, y, c) of, the pixel.

After a pixel included in each tile is identified, the luminance analysis means 42 performs analysis of luminance distribution in the tile by calculating an average of luminances for each tile and by generating an average luminance Tav of each tile.

Figure 7:
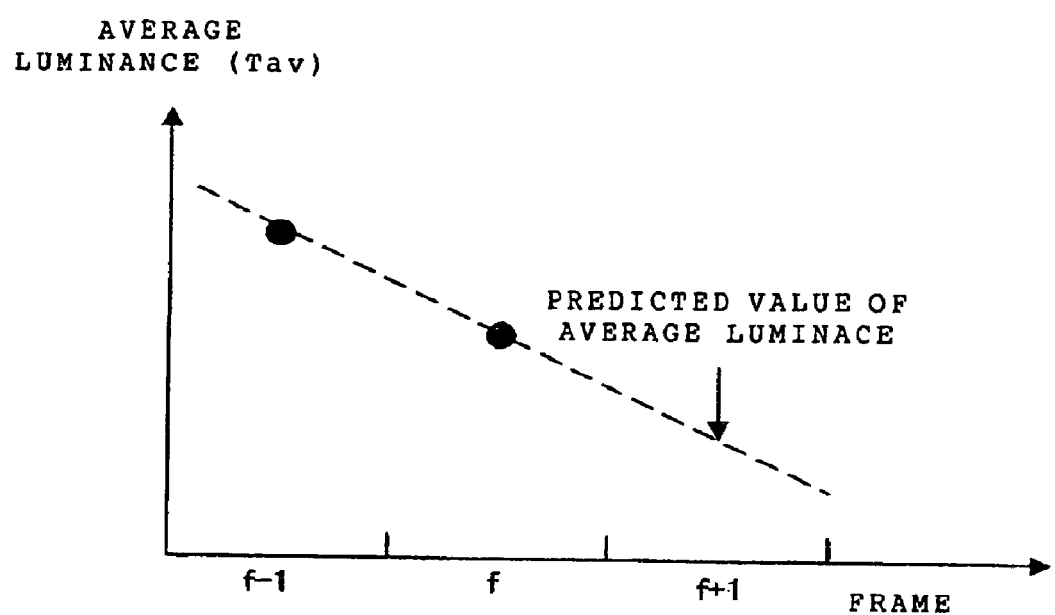
FIG. 7 is a diagram showing a mode of the present invention in which luminance is predicted.

An average luminance Tavf in the same tile in a frame which has been processed is stored in luminance storage means 44. Change in an average luminance concerning a predetermined tile T in each frame is extrapolated by use of an appropriate function. Otherwise, a fitting is performed on change in an average luminance concerning a predetermined tile T in each frame by use of an appropriate function. Thereby, predicted is a weight to be assigned to an average luminance of real-time contents after a delayed time needed for embedding wartermark signals has been passed. FIG. 7 shows a mode to be carried out in a case where this processing is performed by use of linear prediction. As in a case of the audio signals, zero is used when a value smaller than zero is predicted.

In invisible amount calculating means 46, an invisible amount $a_t$ is calculated by use of a weighted value which has been predicted, and the invisible amount $a_t$ is outputted. In addition, luminance distributions of a frame f and the previous frames are analyzed, and thereby it can be determined whether an image is being zoomed, panned or still. For this purpose, a motion vector detection method can be used in the present invention. In this case, while an image is being zoomed, a modulation amount concerning a frame to be processed at this moment is also caused to increase or decrease in order to correspond to the zooming. In addition, while an image is being panned, a modulation amount is also panned. While an image is being still, a modulation amount is not changed. Moreover, in the present invention, if, instead of luminance of each tile, luminance of each pixel is used for the detection of the zooming and the panning, precision of each of these detections is improved. However, this also increases an amount of calculation. For this reason, with a delayed time due to embedding wartermark signals taken into consideration, luminance of each tile or luminance of each pixel is selected whenever deemed necessary depending on a system capability.

B. Detailed Configuration of Control Means and Processing by the Same

(B-1) Processing of Generating Wartermark Signals for Audio Signals

Figure 8:
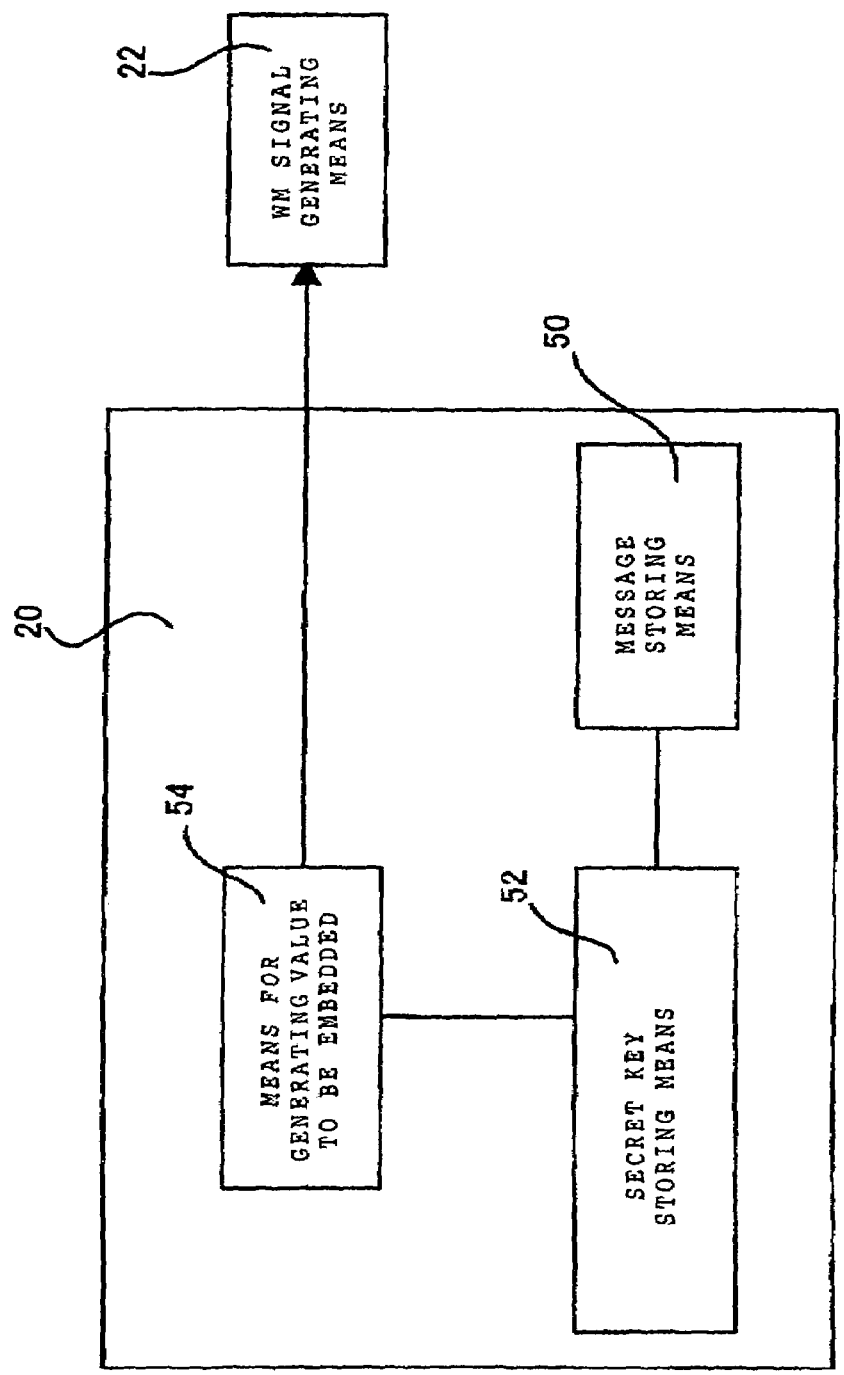
FIG. 8 is a functional block diagram of determination means for processing a video signal in the present invention.

FIG. 8 is a detailed functional block diagram of the control means 20 adapted in the present invention. As shown in FIG. 8, the control means 20 for generating a value to be embedded by which watermark signals are embedded in audio signals in the present invention is configured by including message storage means 50 for storing a message to be embedded, secret key storage means 52 and means 54 for generating a value to be embedded. A value S to be embedded is generated, for each bit on which embedding is performed, by use of these pieces of information and a pseudo-random number (+1, −1). A value S to be embedded which has been generated is transferred to wartermark signal generating means 22, and is used to generate wartermark signals to be outputted. Incidentally, in the present invention, with regard to a digital watermark, wartermark signals can be generated without using a secret key, when confidentiality is not so important. Even in this case, the below-mentioned procedure can be used in the same manner.

Figure 9:
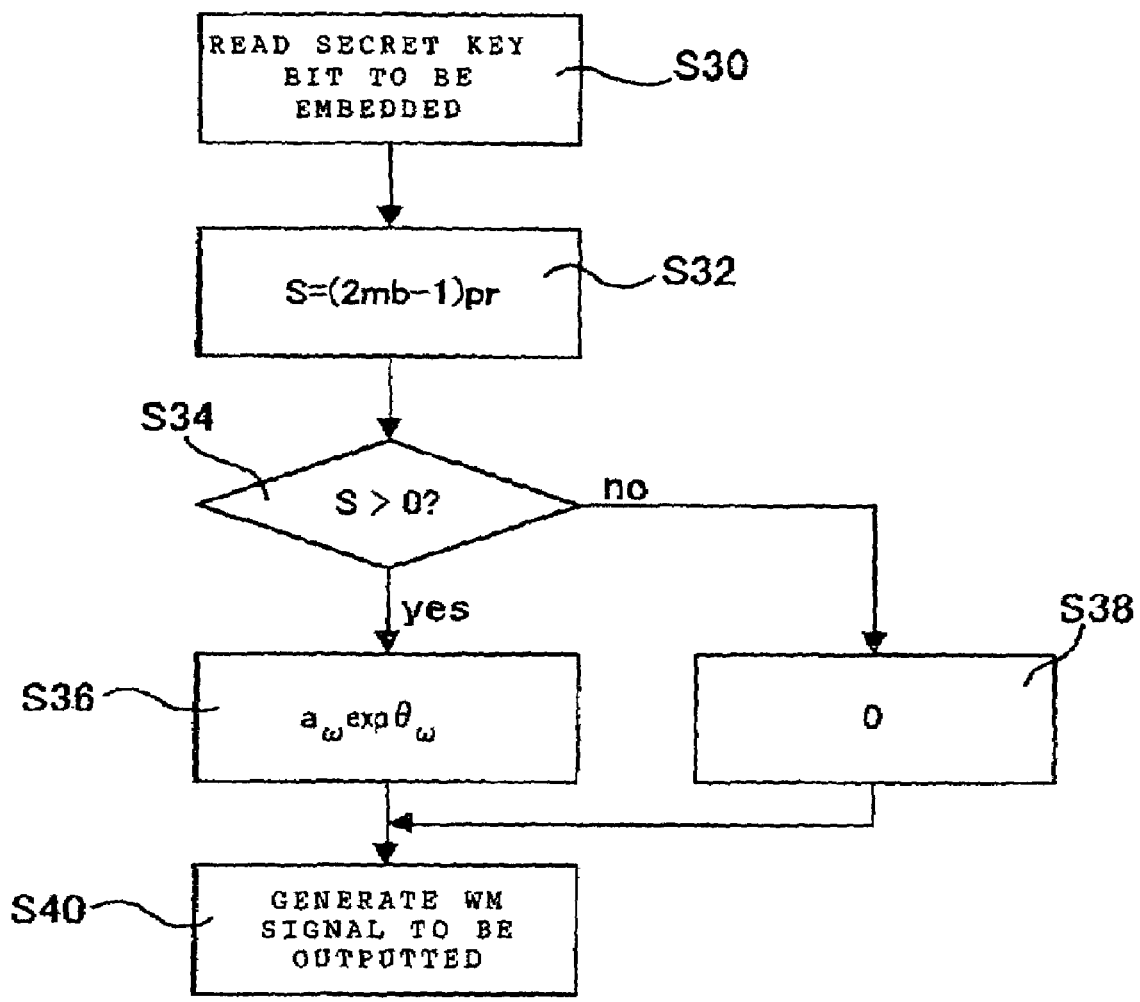
FIG. 9 is a flowchart showing processing of generating a wartermark signal to be outputted for an audio signal in the present invention.

FIG. 9 is a flowchart showing processing of generating wartermark signals in the present invention. As shown in FIG. 9, the processing of generating wartermark signals reads out a sign (1 or 0) of a message to be embedded in each frequency band and pseudo-random number (−1 or 1) corresponding to this in step S30. In step 32, a values to be embedded which is different from one frequency band to another is generated by use of the below-mentioned expression and by use of a bit mb to be embedded and a pseudo-random number pr which have been read out.

[Expression 6]

$$s = (2mb-1)pr \qquad (6)$$

A value S to be embedded which is given by the aforementioned expression (6) is a value which takes on +1 or −1.

Subsequently, in step S34, control of wartermark signals is performed by use of the value S to be embedded which has been generated. If it is judged in a determination of step 34 that the value S to be embedded is a positive (yes), wartermark signals with a random phase having intensity $a_\omega$ which have been predicted in step S 36 are generated as shown by the below-mentioned expression (7). When the value S to be embedded is a negative (no), wartermark signals which take on zero are generated in step S38.

[Expression 7]

$$z_\omega = \begin{cases} a_\omega \exp\theta_\omega & (s > 0) \\ 0 & (s \leq 0) \end{cases} \qquad (7)$$

In the aforementioned expression (7), $\theta_\omega$ is a random number in a range of 0 to $2\pi$.

In the present invention, a rule for embedding in each frequency band, which is given as a value S to be embedded, is generated by use of a secret key, a bit of a message to be embedded as a digital watermark and a pseudo-random number. Furthermore, when the value S to be embedded which has been generated is a negative, a size of the wartermark signal is defined as zero (the wartermark signal is not embedded). Accordingly, even when a delayed time is caused between the wartermark signal and the real-time contents, the frequency component of the wartermark signal represented by zero can be used as a marker, thereby enabling the robustness to be improved.

Subsequently, the wartermark signal generating means 22 subjects to an inverse Fourier transform wartermark signals to be outputted which are constituted as a set of $(a_\omega \exp\theta_\omega, 0)$ which has been generated by the aforementioned expression (7). Then, the wartermark signals in the frequency domain are converted into wartermark signals in the time domain. Thereafter, in step S40, the generated wartermark signals to be outputted are transferred, for example, to the output buffer, and are embedded in contents being supplied in a real-time manner. The aforementioned method can adjust the quality in each frequency component. However, since the method needs the inverse Fourier transform, there may be a case that increases a delayed time. With this taken into consideration, in another mode of the present invention, a method which gets wartermark signals ready for a frequency domain in advance can be used as described below.

Figure 10:
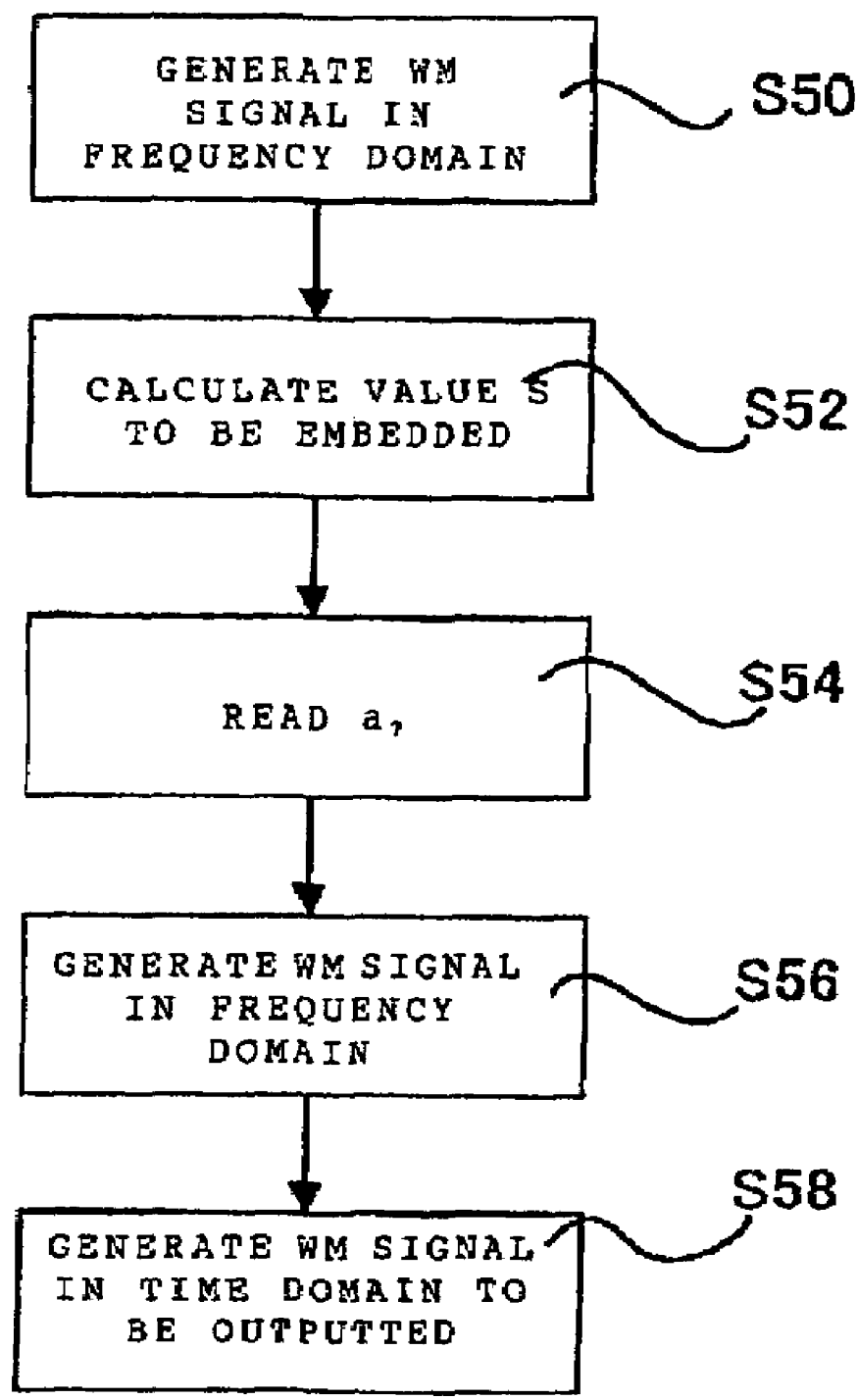
FIG. 10 is a diagram showing another mode of the present invention in which a wartermark signal to be outputted is generated.

FIG. 10 is a flowchart showing an embedding method according to this mode of the present invention, which gets wartermark signals ready for the frequency domain in advance.

As shown in FIG. 10, in step S50, wartermark signals in the frequency domain are generated in advance. The wartermark signals in which an invisible amount to be previously stored in an appropriate memory is stored can be given in the frequency domain by the below-mentioned expression (8).

[Expression 8]

$$n_\omega = A \exp \theta_\omega \qquad (8)$$

In the aforementioned expression, $\theta_\omega$ is a random number in a range of 0 to $2\pi$. Subsequently, a value to be embedded is calculated in step S52. Sizes $a_\omega$ of wartermark signals which are being stored in an appropriate memory or the like are read out in step S54. wartermark signals in the frequency domain are generated by use of the below-mentioned expression (9) in step S56.

[Expression 9]

$$z_\omega = \begin{cases} \dfrac{a_\omega}{A} n\omega & (s > 0) \\ 0 & (s \leq 0) \end{cases} \qquad (9)$$

Thereafter, the wartermark signals in the frequency domain are converted into wartermark signal in the time domain in step S58, and the wartermark signals are embedded in the real-time contents. In this mode of the present inventions, since the same $n_\omega$ is used in every frame as shown by the aforementioned expression (9), rapidness can be realized. In addition, if use of the same $n_\omega$ generates a regular pattern in wartermark signals, it is likely that a problem with the quality will be caused. In such a case, it is made possible to get a plurality of different $n_\omega$s ready and to accordingly use a different wartermark signal for each frame.

Figure 11:
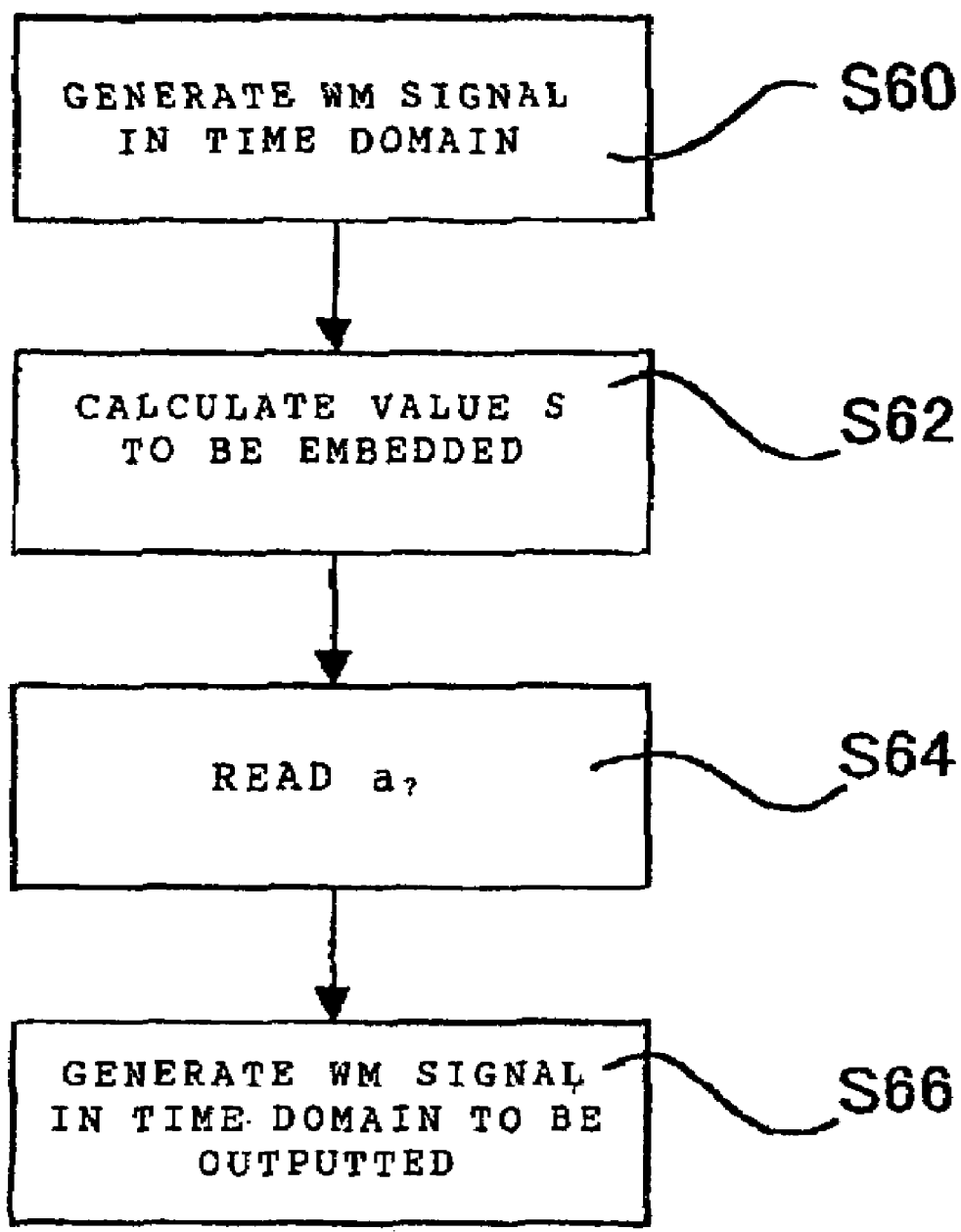
FIG. 11 is a diagram showing yet another mode of the present invention in which a wartermark signal to be outputted is generated.

In yet another mode of the present invention, it is made possible to generate wartermark signals in the time domain in advance and to embed the wartermark signals in the time domain as wartermark signals without causing the inverse Fourier transform to be performed. FIG. 11 shows a flowchart of the present mode which has been described above concerning the present invention. As shown in FIG. 11, in step S60, the wartermark signals in the time domain are generated in advance by performing the inverse Fourier transform. Thereafter, in step S62, a value sb to be embedded is calculated by use of a secret key, a bit of a message and a pseudo-random number. Subsequently, in step S64, amplitudes $a_\omega$ of the wartermark signals are read out. In step S66, wartermark signals zt in the time domain to be outputted are generated, according to the below-mentioned expression (10), by use of the generated value sb to be embedded.

[Expression 10]

$$z_t = \sum_{b=1}^{B} \left( \frac{s_b + 1}{2} \sqrt{\frac{E_{a,b}}{E_{n,b}}} \, n_{b,t} \right) \quad (10)$$

In the aforementioned expression, $E_{a,b}$ represents inaudible energy in a frequency band b, and $E_{n,b}$ represents inaudible energy in a prepared frequency band b. These are given respectively by the below-mentioned expressions (11) and (12).

[Expression 11]

$$E_{a,b} = \sum_{\omega \in Band(b)} a_\omega^2 \quad (11)$$

[Expression 12]

$$E_{n,b} = \sum_{t=1}^{N} n_{b,t}^2 \quad (12)$$

According to the method shown in FIG. 11, the inverse Fourier transform from the frequency domain is not necessary, thereby enabling the rapidness to be achieved.

(B-2) Wartermark Signal Generation in Video Signals and Processing of the Same

Figure 12:
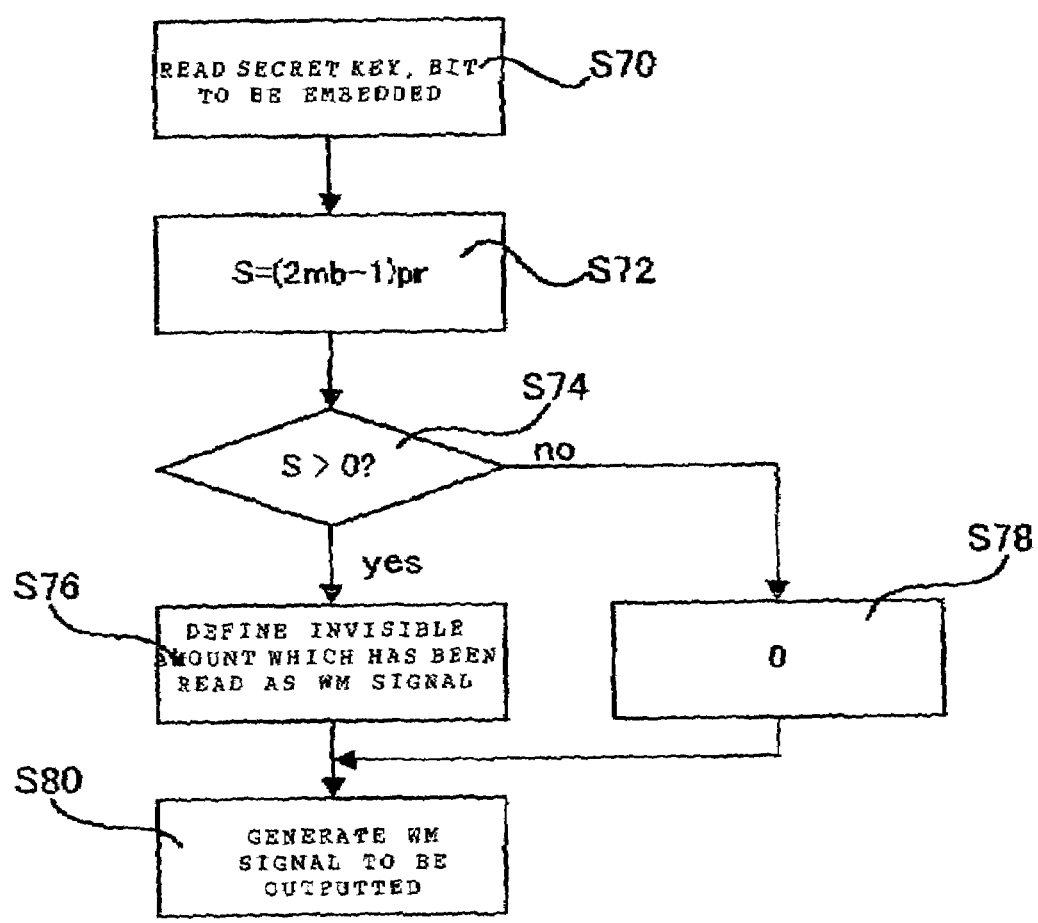
FIG. 12 is a flowchart showing processing of generating a wartermark signal to be outputted for an audio signal in the present invention.

When the present invention is adapted for video signals, processing of generating a watermark signal which has the same function as the processing shown in FIG. 9 does can be used. In the present invention, MPEG-2 and video signals with an advanced format can be used as video signals. When the present invention is adapted for video signals, a sign and a pseudo-random number to be assigned to each tile are determined in advance, and a value S to be embedded is calculated for each tile by use of a secret key. Thereby, a digital watermark can be embedded by adding or subtracting an invisible amount. FIG. 12 shows a flowchart showing a case where the present invention is adapted for video signals.

Processing of adapting the present invention for video signals shown in FIG. 12 reads out a secret key and a bit of a message to be embedded in step S70. In step S72, a value S to be embedded is calculated by use of a pseudo-random number, the secret key, the bit of the message and a bit for each tile. In step 74, it is determined whether or not the value S to be embedded is larger than zero. In steps S76 and S78, wartermark signals including a signal represented by zero are generated in association with the value S to be embedded. In step 80, these signals are generated as wartermark signals to be outputted.

Figure 13:
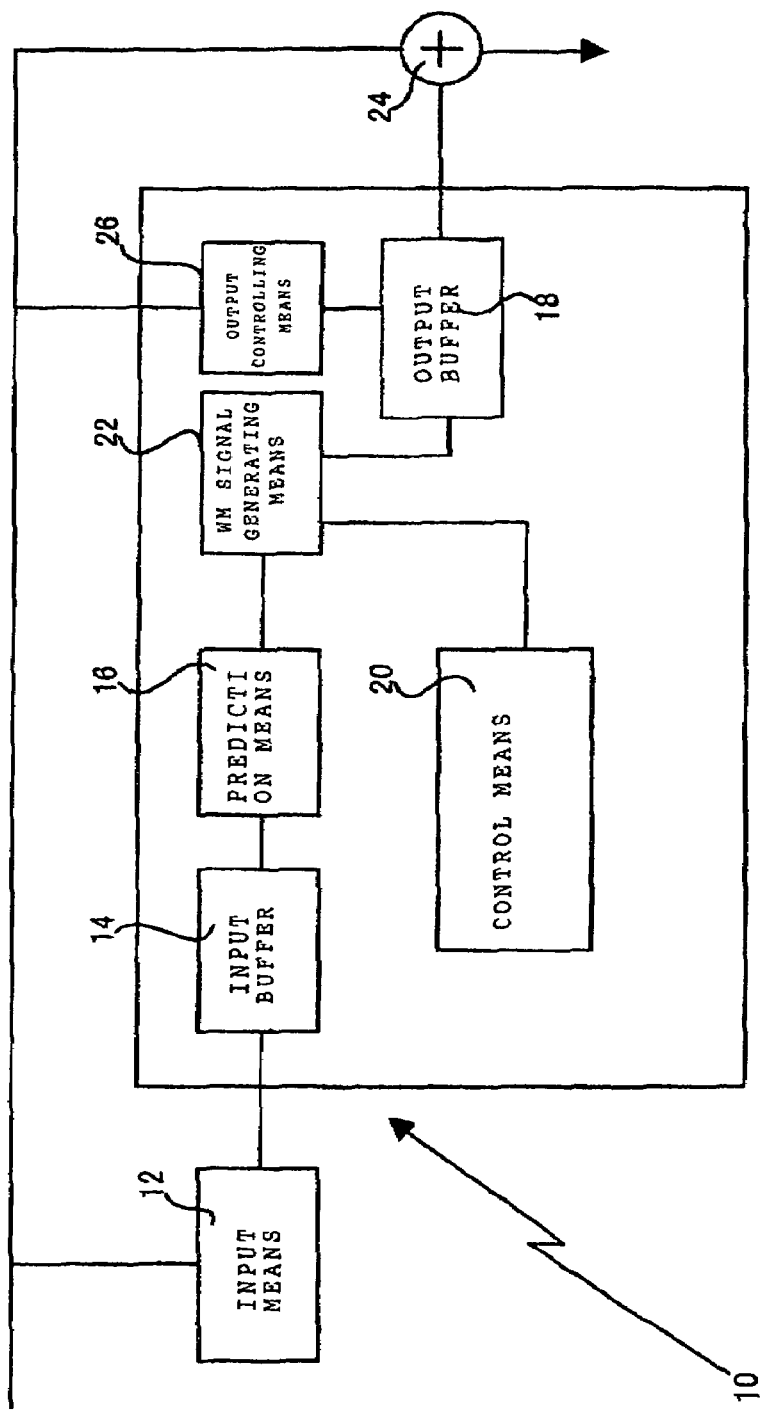
FIG. 13 is a diagram showing another mode of the wartermark signal generating apparatus according to the present invention.

FIG. 13 is a diagram showing another mode of the wartermark signal generating apparatus 10 according to the present invention. The wartermark signal generating apparatus 10 shown in FIG. 13 is configured by including: input means 12 for dividing, and inputting, real-time contents; an input buffer 14 for processing the real-time contents which have been obtained by the input means 12 in an uninterrupted manner; prediction means 16 for predicting wartermark signals in a futuristic manner by use of data which have been accumulated in the input buffer 14; and an output buffer 18 for accumulating the generated wartermark signals before the generated wartermark signals are outputted. Control means 20 includes a secret key and a message. In the same manner as has been described in FIG. 1, the control means 20 calculates a value S to be embedded, and transfers the value S to be embedded to wartermark signal generating means 22.

Wartermark signals to be outputted which has been generated by the wartermark signal generating means 22 are once transferred to the output buffer 18, and are stored in the output buffer 18. In addition, the wartermark signal generating apparatus 10 shown in FIG. 13 is configured by including output controlling means 26. From a predicted value which is generated from time development of real-time contents and intensities of the real-time contents at a time the predicted value is generated, this output controlling means 26 generates a difference between the predicted value and the intensities of the real-time contents.

The difference which has been generated by the output controlling means 26 is compared with a threshold value which has been set in advance with an inaudible amount or an invisible amount taken into consideration, and the wartermark signals and the real-time contents at a time the difference is compared with the threshold value are inputted in the difference. It is determined whether or not the predicted value is appropriate as the inaudible amount or the invisible amount. When the predicted value is appropriate, the wartermark signals which have been stored in the output buffer 18 are caused to be outputted. Thereby, the wartermark signals are embedded as a digital watermark in the real-time contents. In addition, when the wartermark signals are too large, output of the wartermark signals to the embedding means 24 is halted, thereby causing the wartermark signals not to be embedded. Furthermore, in the present invention, the wartermark signal generating apparatus 10 can be configured so that an appropriate inaudible amount is defined by multiplying an appropriate attenuation factor, and thereafter is outputted.

Figure 14:
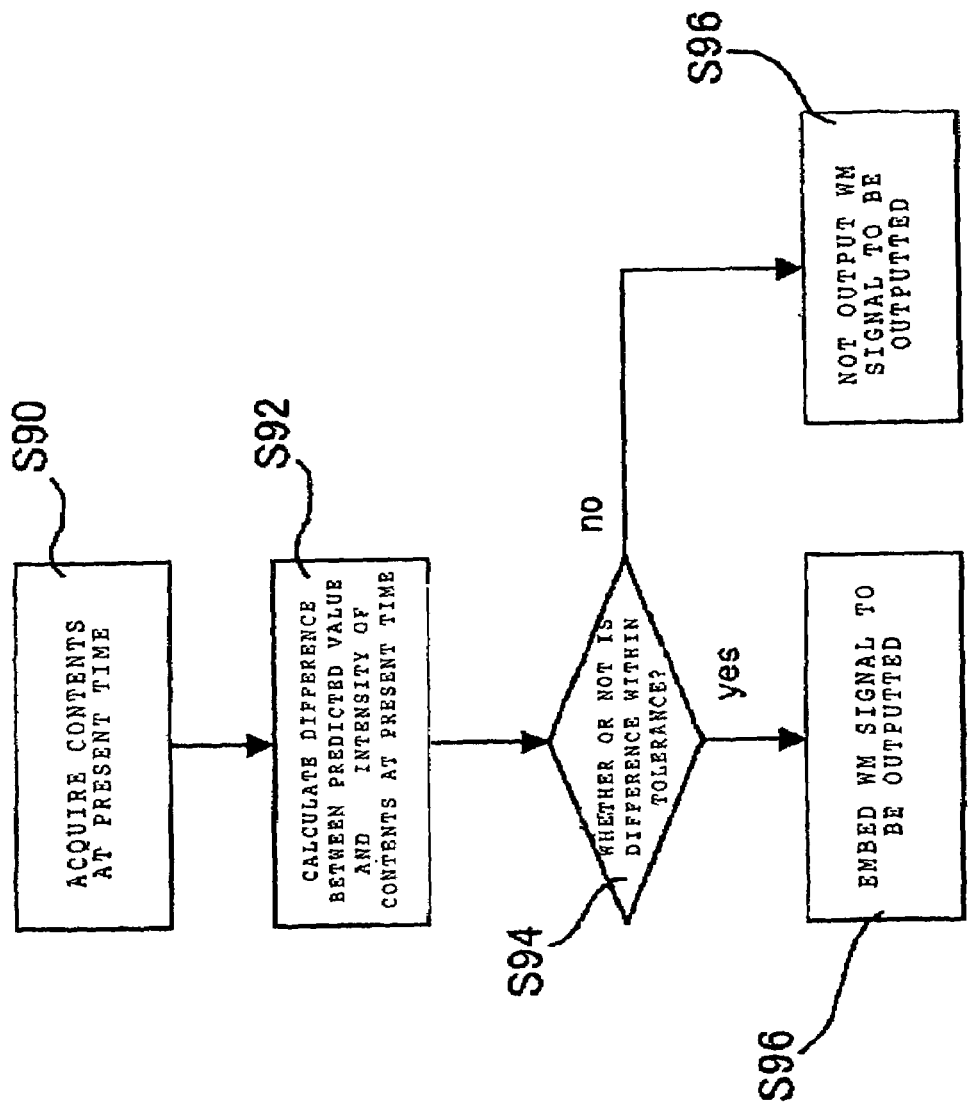
FIG. 14 is a flowchart showing processing in the wartermark signal generating apparatus shown in FIG. 13.

FIG. 14 shows a flowchart of processing to be added to the processing according to this mode of the present invention shown in FIG. 13. As shown in FIG. 14, in step S90, real-time contents at a present time are acquired. In step S92, calculated is a difference between a predicted value and each of intensities of the real-time contents at the time. In step S94, it is determined whether or not the difference is within a tolerance. When the difference is within the tolerance (yes), the wartermark signals to be outputted are caused to be embedded in step S96. In addition, when the difference is not within the tolerance (no), the wartermark signals to be outputted are not embedded since the quality of the real-time contents is deteriorated if the wartermark signals are embedded.

If the mode of the present invention shown in FIGS. 13 and 14 is used, wartermark signals with inappropriate sizes are not embedded, thereby enabling quality of contents being supplied in a real-time manner to be improved further. In addition, the processing of determining whether or not a predicted value is appropriate, which is shown in FIG. 14, can be adapted for embedding wartermark signals in video signals.

EMBODIMENTS

Descriptions will be given below of a wartermark signal generating apparatus, a digital watermark embedding apparatus and a digital television apparatus according to the present invention with reference to concrete embodiments shown in the accompanying drawings.

Embodiment 1

Use in Broadcasting Facilities

Figure 15:
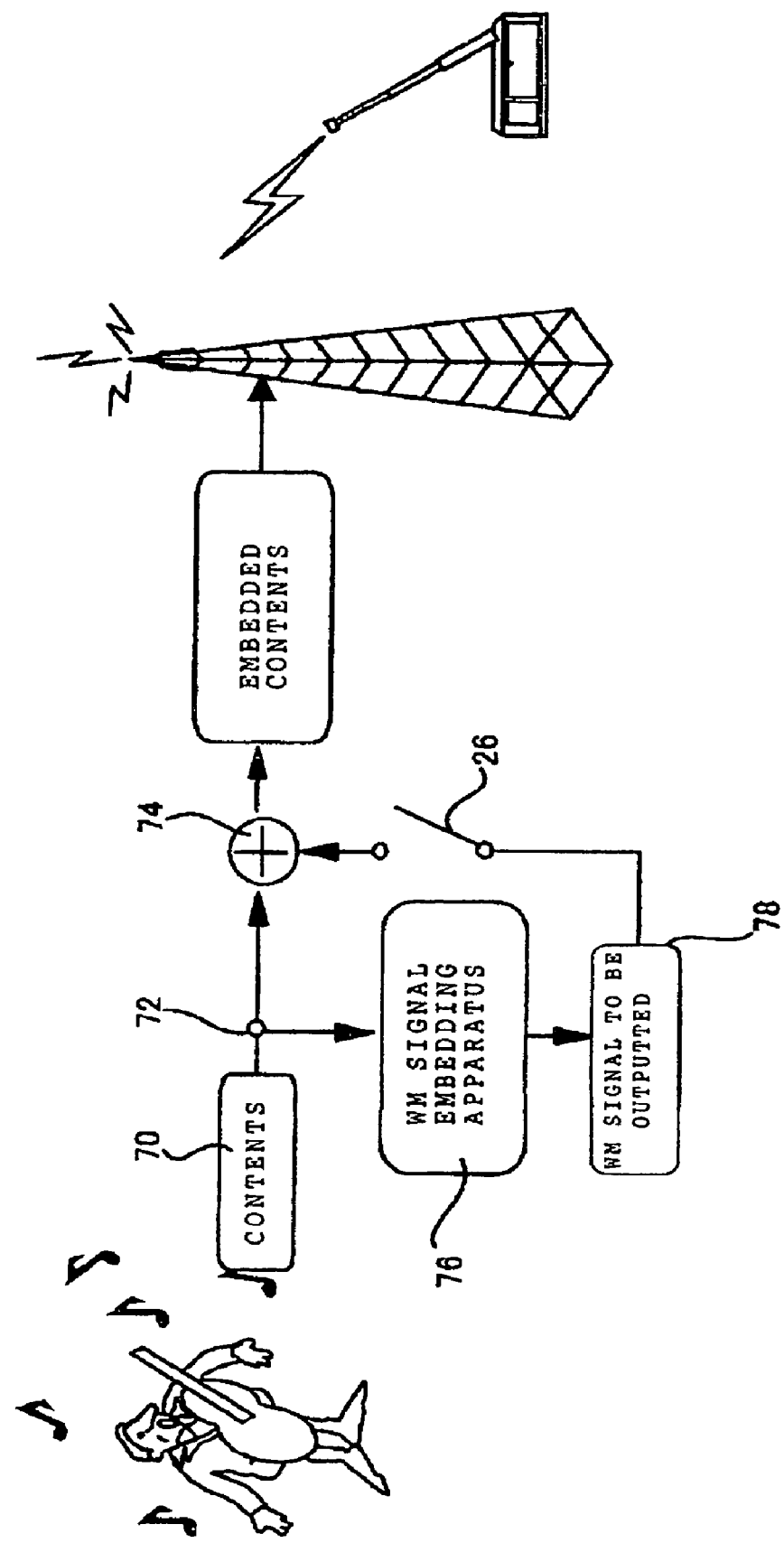
FIG. 15 is a diagram showing an embodiment of a digital watermark embedding apparatus according to the present invention.

FIG. 15 shows an embodiment of the digital watermark embedding apparatus used for showing copyrights of contents which are being broadcast live through radio and television.

In the embodiment shown in FIG. 15, sounds of real-time contents are recorded by use of a microphone 70 in a studio or the like. Contents whose sounds have been recorded are divided into two halves by use of a mixer 72 to be used as dividing means. One half of the microphone output is inputted into a mixer 74. The other half of the microphone output is inputted into a wartermark signal generating apparatus 76 according to the present invention.

The wartermark signal generating apparatus 76 is caused to generate wartermark signals 78 to be outputted. Sizes of the wartermark signals to be outputted are checked by the output controlling means 26, and thereafter are inputted into the mixer 74. The inputted wartermark signals to be outputted are embedded in real-time contents at the time, and thereby the embedded contents 80 are generated. The embedded contents 80 which have been generated are supplied to users through an appropriate communication network. As the network according to the embodiment shown in FIG. 15, groundwave communication, satellite communication, cable network, the Internet or the like can be used.

In the embodiment shown in FIG. 15 of the present invention, in a case where the mixer 74 can adjust sizes of wartermark signals, the configuration for determining the sizes of the wartermark signals, which has been described in FIGS. 13 and 14, needs not to be adapted for the wartermark signal generating apparatus 76. However, in the embodiment shown in FIG. 15, too, the configuration shown in FIG. 13 can be adopted as the wartermark signal generating apparatus 76. According to the embodiment shown in FIG. 15, it is made possible to supply to users music played live and a live broadcast by adding a digital watermark thereto.

Figure 16:
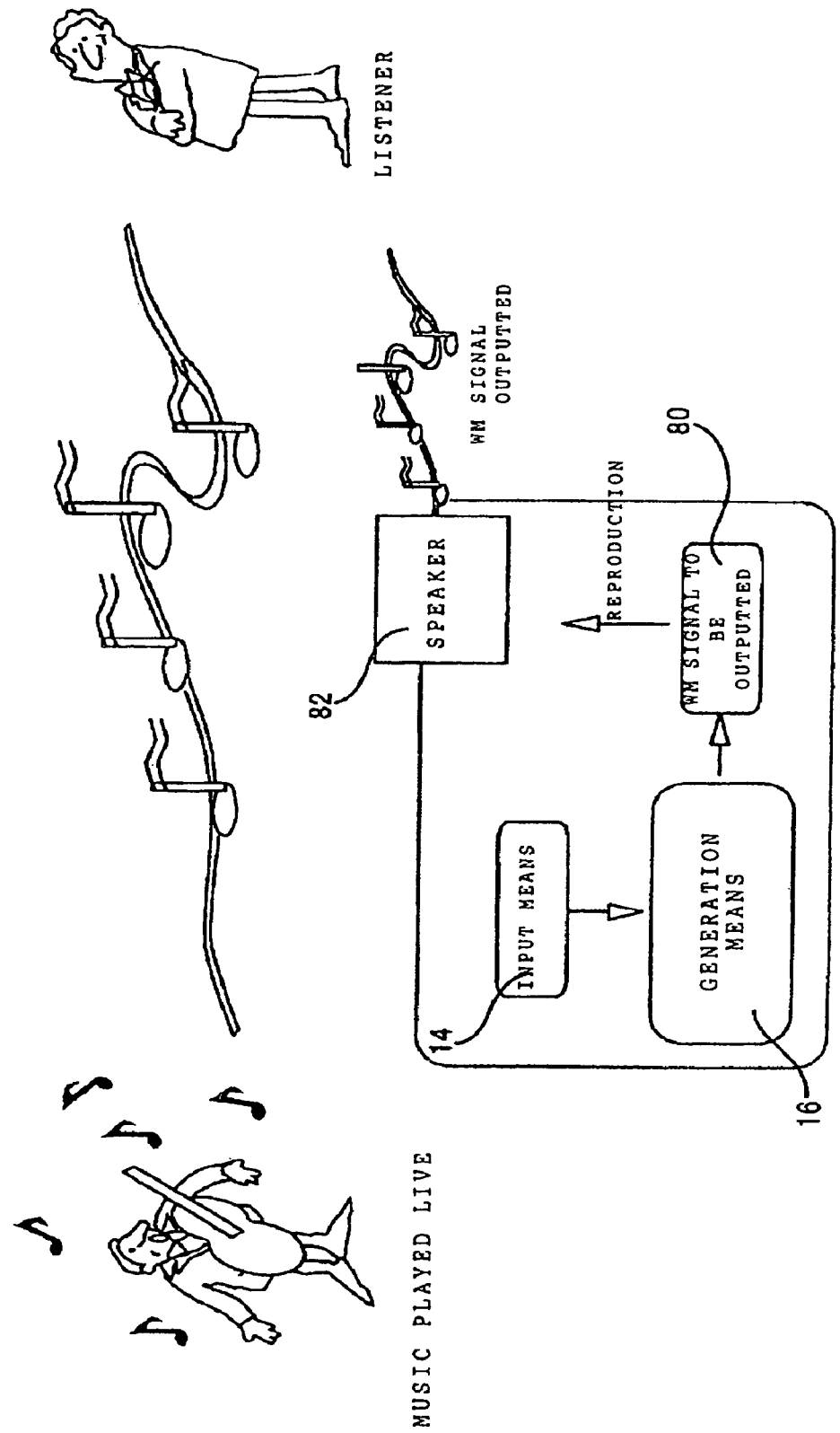
FIG. 16 is a diagram showing another embodiment of the digital watermark embedding apparatus according to the present invention.

FIG. 16 is a diagram showing another embodiment with which a digital watermark generating apparatus according to the present invention is adapted in a concert hall. In the embodiment shown in FIG. 16, contents are supplied directly to users through no sound recording means such as a microphone in common with classical music to be played in a concert hall. For this reason, in the embodiment shown in FIG. 16, a digital watermark embedding apparatus 80 is configured by including: input means 14 such as a microphone; and audio signal generating apparatus 82 such as an amplifier and a speaker, thereby embedding a digital watermark in contents directly.

Furthermore, in a modification of this embodiment of the present invention, the audio signal generating apparatus 82 can be allocated to each player, instead of being allocated to a whole group of players. In the embodiment with which the plurality of audio signal generating apparatuses 82 are placed respectively near players, consistency between each of real-time contents and each of wartermark signals to be outputted can be guaranteed in an assured manner, thereby enabling further improvement in the quality to be achieved. In this case, if a plurality of wartermark signals to be outputted are mixed together with delay in time, the robustness is adversely affected. For this reason, it is preferable that the plurality of audio signal generation apparatuses 82 be synchronized in terms of timing.

Figure 17:
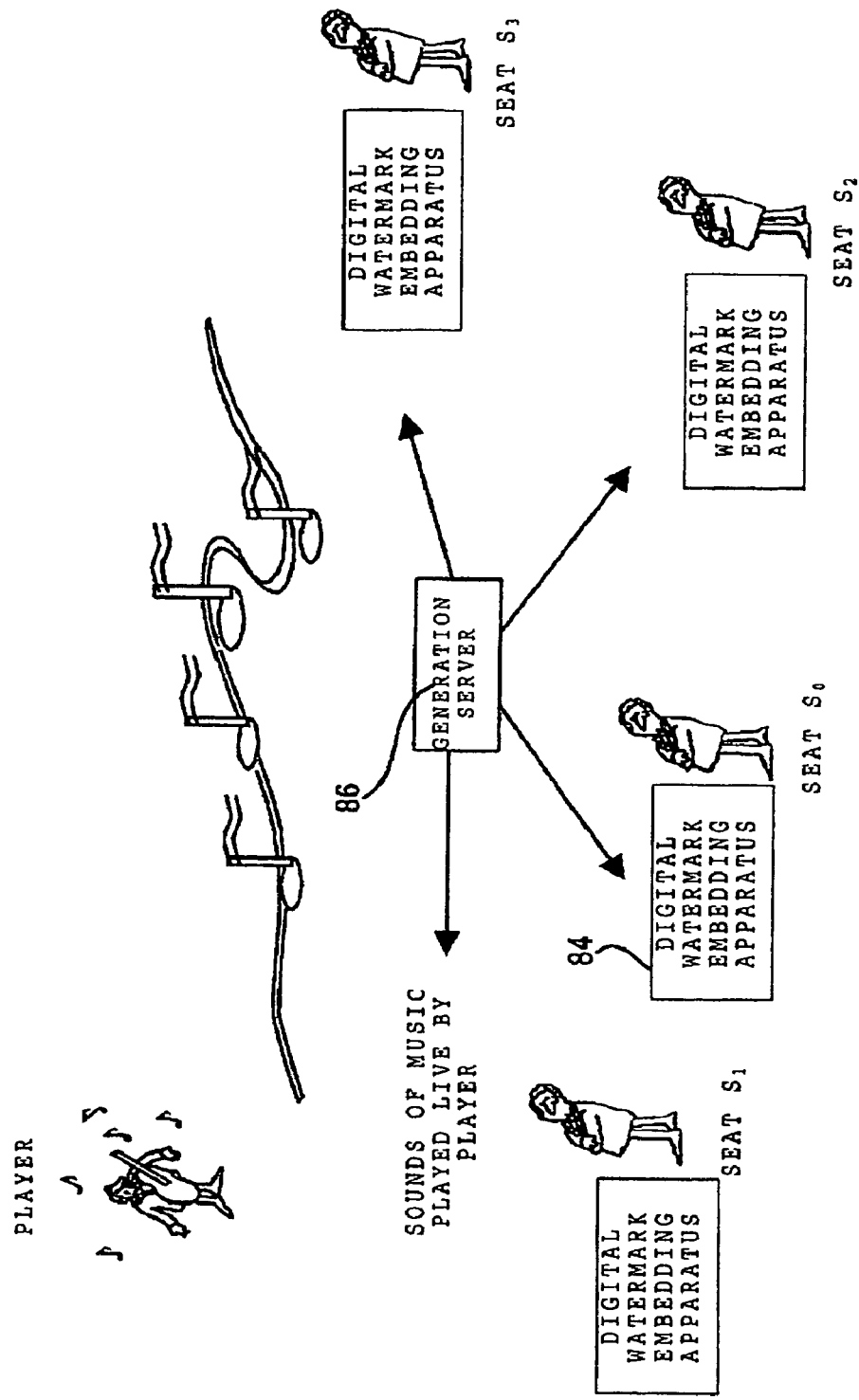
FIG. 17 is a diagram showing yet another embodiment of the digital watermark embedding apparatus according to the present invention.

FIG. 17 is a diagram showing yet another embodiment of the present invention which enables unauthorized sound recording to be identified. In the embodiment shown in FIG. 17, it is supposed that classical music is being supplied as real-time contents. Here, it is supposed that a listener sitting in a seat $S_0$ is recording sounds in an unauthorized manner. It is supposed that an identification number specific to the concert hall is assigned to each of seats $S_0$ to $S_3$. It is supposed that, for example, outputted wartermark signals corresponding to an identification number are configured to be supplied as audio signals from near each of the listeners through a small microphone. In the embodiment, shown in FIG. 17, the wartermark signals to be outputted are generated by a digital watermark embedding apparatus 84 which is allocated near each of the listeners.

However, in a modification of the embodiment shown in FIG. 17, it is made possible to provide a digital watermark generating server 86 separately, and to cause the digital watermark generating server 86 to generate wartermark signals to be outputted corresponding to an identification numbers by use of a secret key or a message which has been assigned to each seat. The wartermark signals to be outputted which have been generated for each seat are transferred to a small microphone which has been allocated to the seat or the like. Thereby, the wartermark signals to be outputted, which are different from one listener to another, can be supplied.

In the embodiment shown in FIG. 17, a digital watermark, which is different from one seat to another, is embedded. Accordingly, an effect can be obtained that, when a person who has recorded sounds in an unauthorized manner records the sounds in CDs or DVDs and sells them illegally, too, it is easy to trace the person who has recorded the sounds in an authorized manner.

The digital watermark embedding apparatus according to the present invention can be also used to embed a digital watermark for the purpose of claiming copyrights for real-time contents such as videos being projected in a movie theater. In the below-mentioned embodiments, descriptions will be given of cases where a digital watermark is embedded in image contents being supplied in a real-time manner. As a message to be embedded, the followings can be used as in the case of audio signals; a theater which runs a movie, a sponsor and a co-sponsor, information concerning the movie, a date and time when the movie is run, terms and conditions for copying the movie, and the like.

Figure 18:
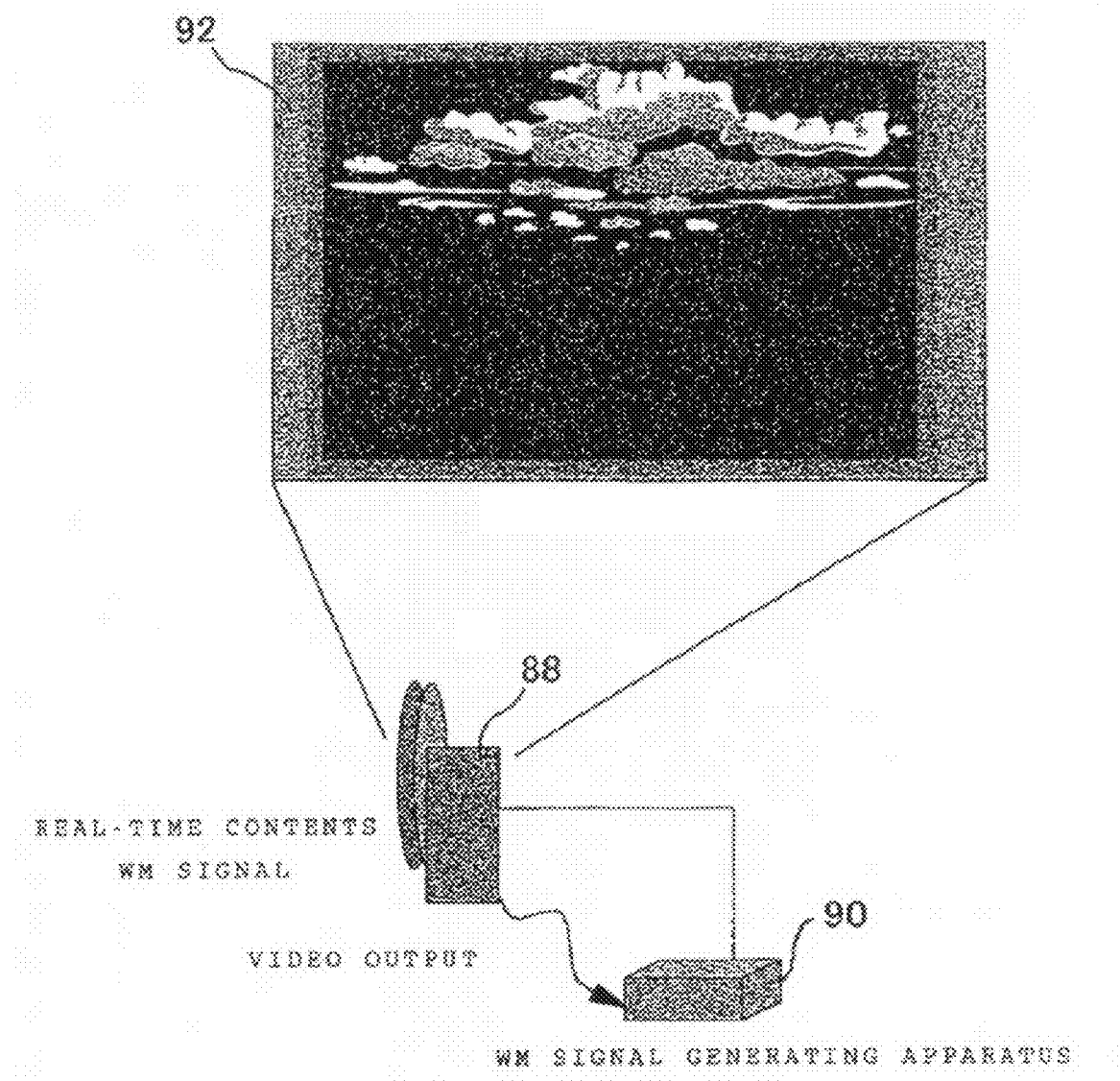
FIG. 18 is a diagram showing still another embodiment of the digital watermark embedding apparatus according to the present invention.

FIG. 18 shows still another embodiment of the present invention to be carried out in a case where a digital watermark is embedded in videos. In the specific embodiment of the present invention shown in FIG. 18, original image contents are reproduced by a projector 88. Simultaneously, video output from the projector 88 is inputted into a wartermark signal generating apparatus 90, and thereby wartermark signals to be outputted are generated. The generated wartermark signals to be outputted are outputted into the projector 88. An image in which the wartermark signals are embedded is projected from the projector 88 to a screen 92. In this manner, wartermark signals to be outputted can be embedded in image contents in a real-time manner.

Figure 19:
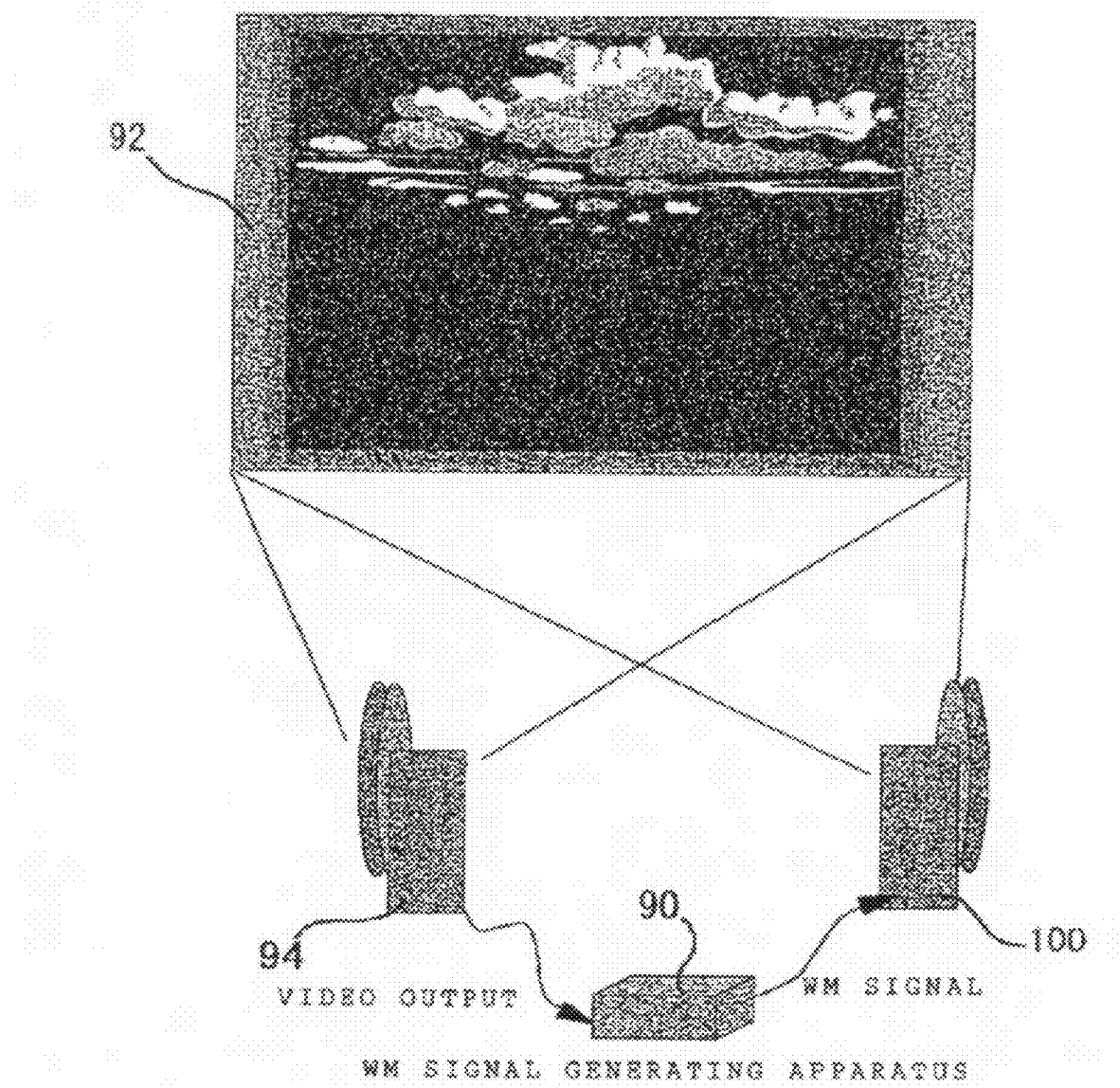
FIG. 19 is a diagram showing further another embodiment of the digital watermark embedding apparatus according to the present invention.

FIG. 19 shows further another embodiment to be carried out in a case where video output of original image contents can be fetched, and where a mixer can not be used. In the embodiment shown in FIG. 19, original image contents are projected from a projector 94 to the screen 92. Thereby, contents are supplied to users. The video output is inputted into the wartermark signal generating apparatus 90 according to the present invention. Thereby, wartermark signals to be outputted are generated. The generated wartermark signals to be outputted are transferred to a projector 100, and are projected onto the screen 92 from the projector 100. Thereby, embedding of a digital watermark can be performed on the screen 92.

Figure 20:
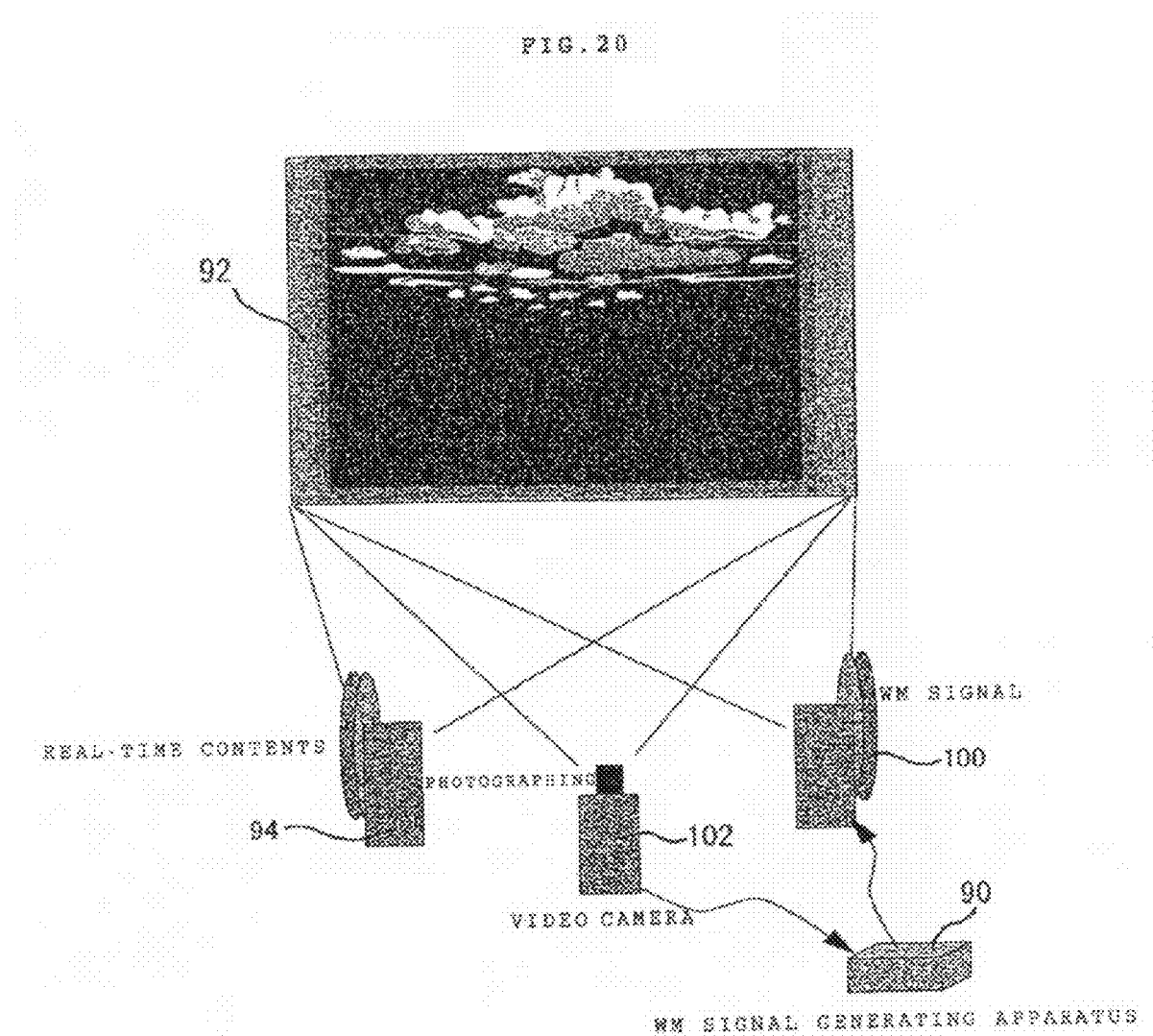
FIG. 20 is a diagram showing yet further another embodiment of the digital watermark embedding apparatus according to the present invention.

In addition, FIG. 20 shows yet further another embodiment to be carried out in a case where video output of original image contents can not be fetched, and where a mixer can not be used. In the embodiment shown in FIG. 20, original image contents are projected onto the screen 92 from the projector 94. Thereby, contents are supplied to users. Contents which have been projected onto the screen 92 are acquired, for example, by a video camera 102, and are inputted into the wartermark signal generating apparatus 90 according to the present invention. Thereafter, wartermark signals to be outputted which have been delayed by the method according to the present invention are generated. The outputted wartermark signals are projected from the projector 100 onto the screen 92. Thereby, embedding of a digital watermark can be performed on the screen. As described above, in the embodiments of the present invention shown in FIGS. 18 to 20, a digital watermark can be embedded in a video image which is being recorded by a video camera which has been brought in to a viewer's seat in an unauthorized manner.

Figure 21:
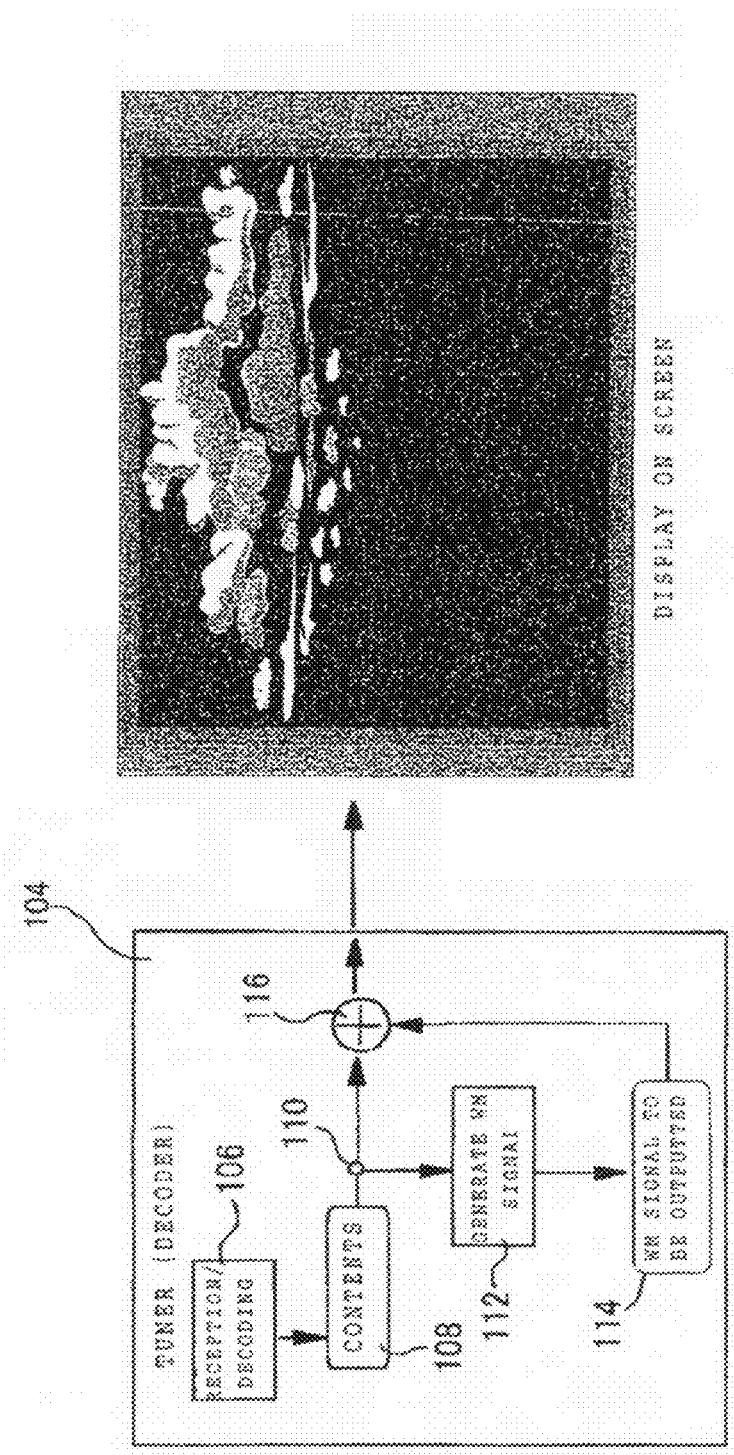
FIG. 21 is a diagram showing an embodiment of a digital television apparatus including the digital watermark embedding apparatus according to the present invention.
Figure 22:
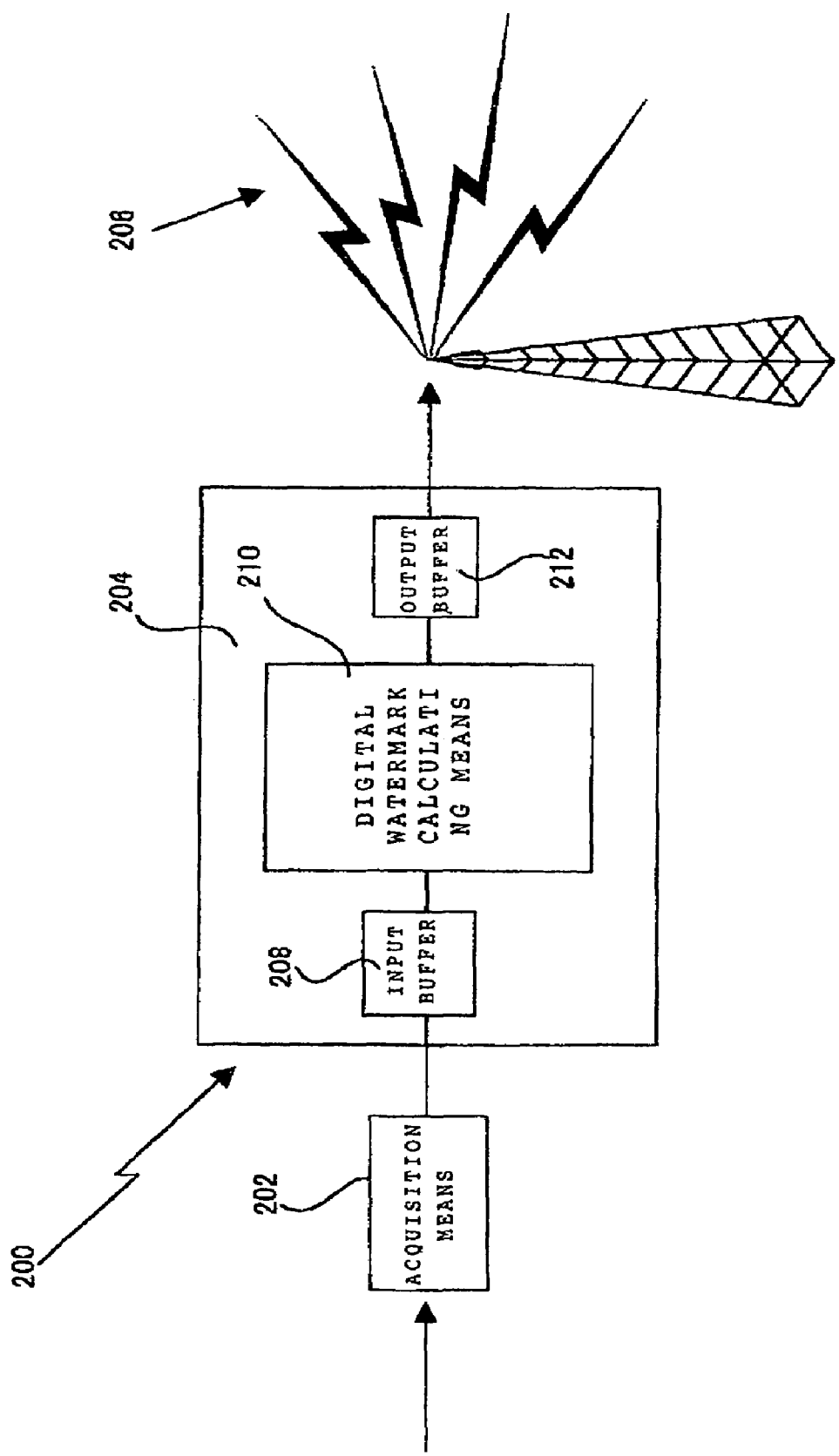
FIG. 22 is a schematic block diagram of a conventional digital watermark embedding apparatus.
Figure 23:
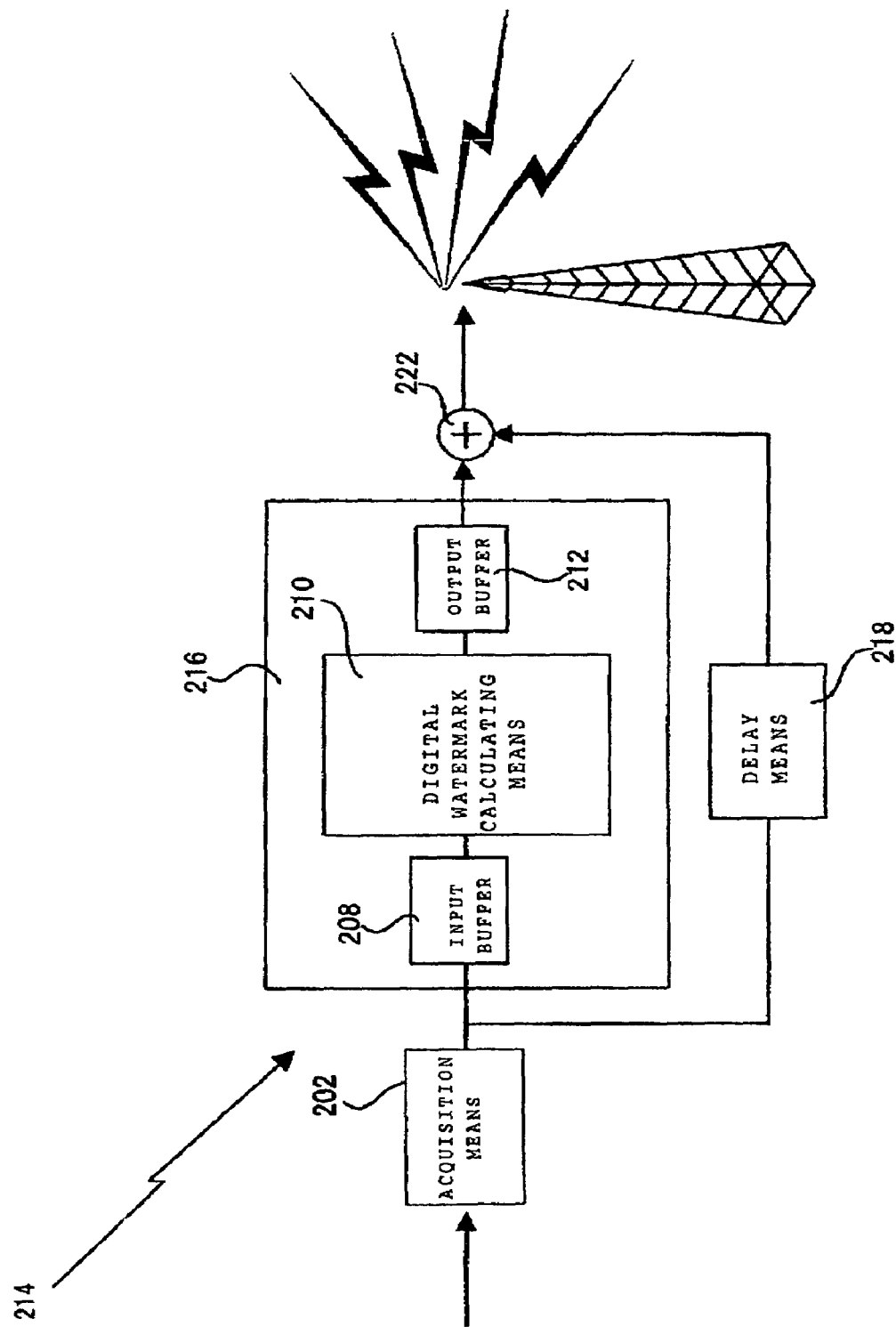
FIG. 23 is a schematic block diagram of another conventional digital watermark embedding apparatus.
Figure 24:
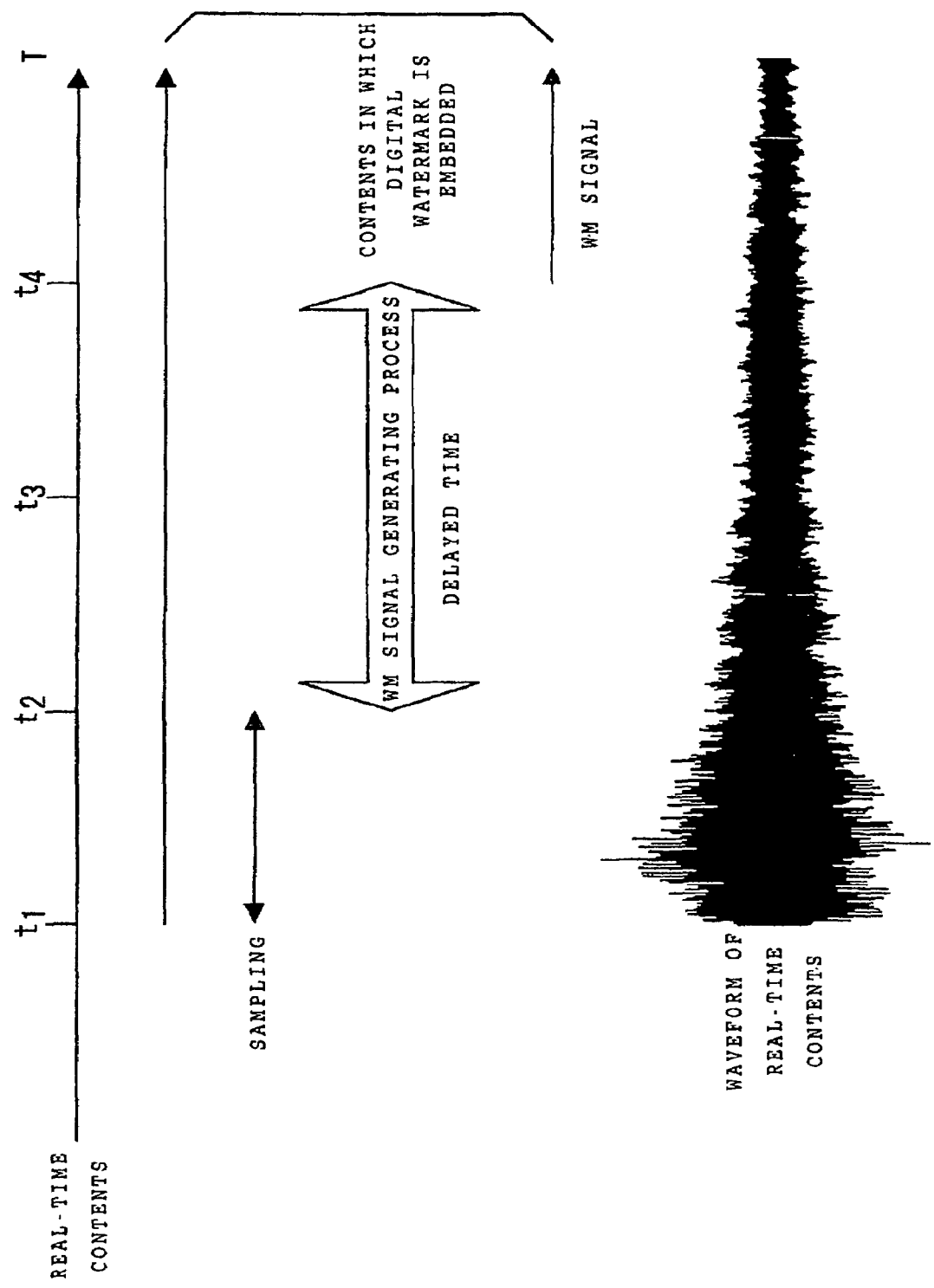
FIG. 24 is a diagram showing relations of time delays to be caused by generating a wartermark signal.

FIG. 21 shows an embodiment to be carried out to deal with a case where contents which have been supplied to a user by a digital television apparatus are recorded by the user for an illicit purpose. In the embodiment shown in FIG. 21, a digital watermark generating apparatus according to the present invention is an external device 104 to be arranged adjacent to the digital television apparatus. Data which have been received by an antenna through a digital communication network are tuned and decoded in a tuner-decoder 106, and are converted into contents 108 to be outputted to a television monitor through an error corrector and a demultiplexer. The contents 108 are divided into two halves in a mixer 110, and are inputted into a wartermark signal generating apparatus 112 according to the present invention. The wartermark signal generating apparatus 112 according to the present invention, which is shown in FIG. 18, generates wartermark signals 114 to be outputted for audio signals and image signals by use of the methods which have been described above. Thereafter, the generated wartermark signals 114 to be outputted are transferred to a mixer 116. Thereby, a digital watermark can be embedded in the contents 108. In the embodiment shown in FIG. 21, a digital watermark is configured to be embedded in contents which have been transmitted through a digital television broadcast, thereby enabling the recording of videos and sounds by a user in an unauthorized manner to be identified.

Furthermore, yet another embodiment of the present invention is not limited to being used for real-time contents whose change with time is particularly large. The embodiment can be also used to prevent an unauthorized acquisition of a video image of a work of art exhibited in an art museum by projecting a digital watermark onto the work of art by use of a projector. In addition, the present invention can be adapted for embedding a digital watermark in streaming in distribution through the Internet in a real-time manner.

Each means which has been described in the present invention can be configured of software modules to be configured in a software manner in a computer or an information processing apparatus which includes a memory such as a central processing unit (CPU), a RAM and a ROM as well as a storage medium such as a hard disc. Furthermore, as long as the aforementioned software module has the functions which have been described in the present invention, the software module can be configured as a different function block configuration instead of being included as a configuration corresponding to the function block shown in the figures. Moreover, the program which causes the digital watermark generating method of the present invention to be performed can be described by use of various programming languages such as an assembler language, a C language, a C++ language, a Java (a registered trademark). A code in which a program of the present invention is described can be included as a firmware in a RAM, a ROM and a flash memory. Otherwise, the code can be stored in a computer-readable storage medium such as a magnetic tape, a flexible disc, a hard disc, a compact disc, a photo-magnetic disc, a digital versatile disc (DVD).

The present invention has been explained citing the concrete modes described in the accompanying drawings. However, the present invention is not limited to a specific one of the aforementioned modes. Various modifications and other modes can be used within a scope in which effects of the present invention can be achieved. Any constituent component which has been known until now can be used within a scope in which effects of the present invention can be achieved.

What is claimed is:

1. A watermark signal generating method for generating watermark signals to be embedded as a digital watermark in real-time contents of a plurality of video frames, comprising the steps of:
   inputting the real-time contents;
   storing the real-time contents;
   generating, from the real-time contents, watermark signals to be outputted corresponding to predicted intensities of the real-time contents; and
   storing the generated watermark signals to be outputted, wherein
   the generation step includes the steps of:
   dividing each of the video frames into tiles including pixels with respective associated luminances;
   analyzing luminance distribution in a selected tile by calculating an average of luminances from the pixels within the selected tile;
   generating an average luminance for each tile in the video frame;
   predicting intensities of the watermark signals from a weight assigned to the average luminance of each tile of each video frame of the real-time contents after a predetermined lapse of time;
   generating a value to be embedded for the purpose of controlling a value of the watermark signal to be outputted by use of a message to be embedded as a digital watermark in the real-time contents; and
   controlling the watermark signals to be outputted according to the value to be embedded, and generating the watermark signals to be outputted by use of the intensity prediction of the watermark signals if the value to be embedded is positive, and not generating the watermark signals to be outputted if the value to be embedded is negative.

* * * * *